United States Patent
Jaini et al.

(10) Patent No.: US 12,269,177 B2
(45) Date of Patent: Apr. 8, 2025

(54) MACHINE LEARNING BASED ON A PROBABILITY DISTRIBUTION OF SENSOR DATA

(71) Applicant: Robert Bosch GmbH, Stuttgart (DE)

(72) Inventors: Priyank Jaini, Amsterdam (NL); Lars Holdijk, Brummen (NL); Max Welling, Bussum (NL)

(73) Assignee: ROBERT BOSCH GMBH, Stuttgart (DE)

( * ) Notice: Subject to any disclaimer, the term of this patent is extended or adjusted under 35 U.S.C. 154(b) by 358 days.

(21) Appl. No.: 17/745,290

(22) Filed: May 16, 2022

(65) Prior Publication Data

US 2022/0388172 A1    Dec. 8, 2022

(30) Foreign Application Priority Data

Jun. 7, 2021   (EP) ..................................... 21178046

(51) Int. Cl.
*G06N 20/00* (2019.01)
*B25J 9/16* (2006.01)

(52) U.S. Cl.
CPC .............. *B25J 9/1697* (2013.01); *B25J 9/163* (2013.01); *G06N 20/00* (2019.01)

(58) Field of Classification Search
CPC .......... G06N 20/00; G06N 20/10; G06N 3/08; G06N 3/091; B25J 9/163; G05B 13/027; G05B 13/04; G05B 23/024; G06F 17/18
See application file for complete search history.

(56) References Cited

U.S. PATENT DOCUMENTS

| | | | |
|---|---|---|---|
| 2012/0116584 A1* | 5/2012 | Kim ...................... | B25J 9/1656 901/50 |
| 2016/0180232 A1* | 6/2016 | Tsubouchi ............... | G06N 7/01 706/48 |
| 2019/0325328 A1* | 10/2019 | Katz ...................... | G06F 17/14 |

(Continued)

OTHER PUBLICATIONS

Likelihood-based Density Estimation using Deep Architectures P Jaini—2019 (Year: 2019).*

(Continued)

*Primary Examiner* — Darrin D Dunn
(74) *Attorney, Agent, or Firm* — NORTON ROSE FULBRIGHT US LLP; Gerard A. Messina

(57) ABSTRACT

A computer-implemented method of training a machine learnable model for controlling and/or monitoring a computer-controlled system. The machine learnable model is configured to make inferences based on a probability distribution of sensor data of the computer-controlled system. The machine learnable model is configured to account for symmetries in the probability distribution imposed by the system and/or its environment. The training involves sampling multiple samples of the sensor data according to the probability distribution. Initial values are sampled from a source probability distribution invariant to the one or more symmetries. The samples are iteratively evolved according to a kernel function equivariant to the one or more symmetries. The evolution uses an attraction term and a repulsion term that are defined for a selected sample in terms of gradient directions of the probability distribution and of the kernel function for the multiple samples.

15 Claims, 8 Drawing Sheets

(56) References Cited

U.S. PATENT DOCUMENTS

| | | | | |
|---|---|---|---|---|
| 2020/0073375 | A1* | 3/2020 | Amemiya | G05B 23/0243 |
| 2020/0184373 | A1* | 6/2020 | Yuan | G05B 23/0254 |
| 2020/0371491 | A1* | 11/2020 | Wong | G05B 13/027 |
| 2020/0379454 | A1* | 12/2020 | Trinh | G05B 23/024 |
| 2021/0271926 | A1* | 9/2021 | Esaki | G06F 18/2415 |
| 2022/0067444 | A1* | 3/2022 | Amthor | G06F 18/217 |
| 2022/0388172 | A1* | 12/2022 | Jaini | G06N 20/10 |
| 2022/0406046 | A1* | 12/2022 | Mummadi | G06V 10/764 |
| 2023/0092466 | A1* | 3/2023 | Tokic | G08G 1/0104 |
| 2023/0259363 | A1* | 8/2023 | Zahn | G06N 3/088 703/12 |
| 2023/0370879 | A1* | 11/2023 | Chou | H04W 24/08 |
| 2024/0086770 | A1* | 3/2024 | Barsim | G06N 20/00 |

OTHER PUBLICATIONS

Carreira-Perpiñán et al., "On Contrastive Divergence Learning," Proceedings of Machine Learning Research, PMLR, vol. R5, 2005, pp. 1-8. <http://proceedings.mlr.press/r5/carreira-perpinan05a/carreira-perpinan05a.pdf> Downloaded May 12, 2022.

Reisert et al., "Learning Equivariant Functions With Matrix Valued Kernels", Journal of Machine Learning Research, vol. 8, No. 15, 2007, pp. 385-408. <https://www.jmlr.org/papers/volume8/reisert07a/reisert07a.pdf> Downloaded May 12, 2022.

Kingma et al., "ADAM: a Method for Stochastic Optimization," Cornell University, 2017, pp. 1-15. <https://arxiv.org/pdf/1412.6980.pdf> Downloaded May 12, 2022.

Liu et al., "Learning Deep Energy Models: Contrastive Divergence Vs. Amortized MLE," Cornell University, 2017, pp. 1-10.

Liu et al., "Stein Variational Gradient Descent: a General Purpose Bayesian Inference Algorithm," Cornell University, 2019, pp. 1-13.

Wang et al., "Stein Variational Gradient Descent With Matrix-Valued Kernels," 33rd Conference on Neural Information Processing Systems (NEURIPS 2019), Vancouver, Canada, 2019, pp. 1-17.

Duncan et al., "On the Geometry of Stein Variational Gradient Descent," Cornell University, 2019, pp. 1-41.

Köhler et al., "Equivariant Flows: Exact Likelihood Generative Learning for Symmetric Densities," Proceedings of the 37th International Conference on Machine Learning, Online, PMLR 119, 2020, pp. 1-18.

Papamakarios et al., "Normalizing Flows for Probabilistic Modeling and Inference," Journal of Machine Learning Research, vol. 22, 2021, pp. 1-64.

Satorras et al., "E(N) Equivariant Graph Neural Networks," Proceedings of the 38th International Conference on Machine Learning, PMLR 139, 2021, pp. 1-16.

\* cited by examiner

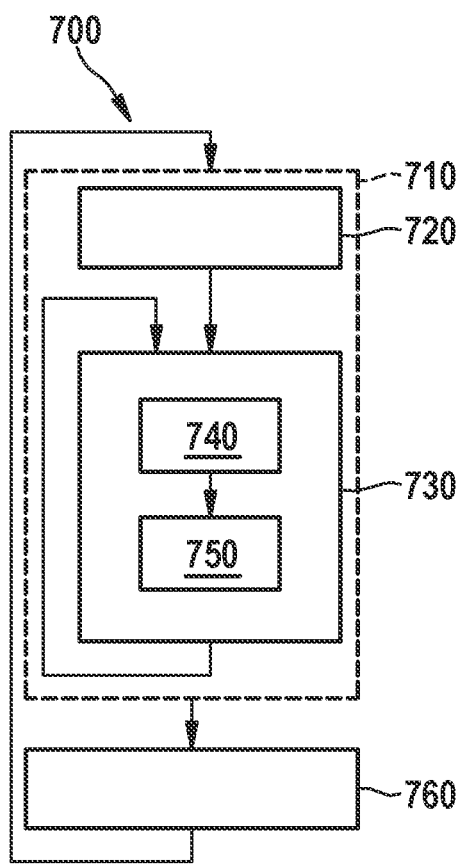
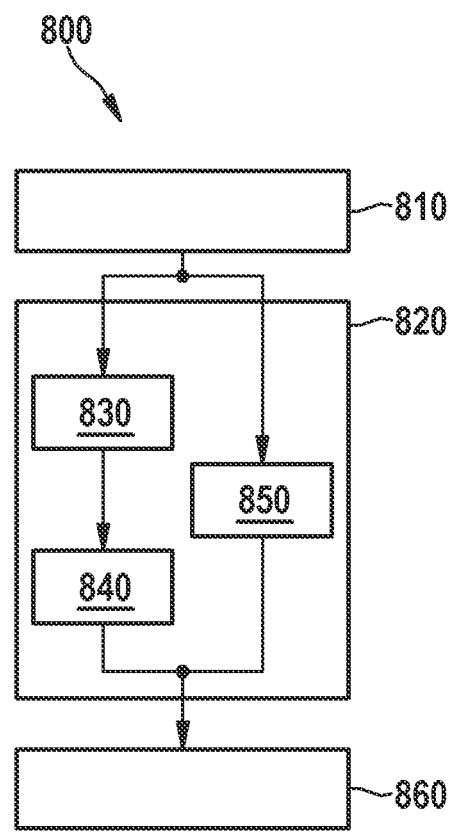
Fig. 7
Fig. 8
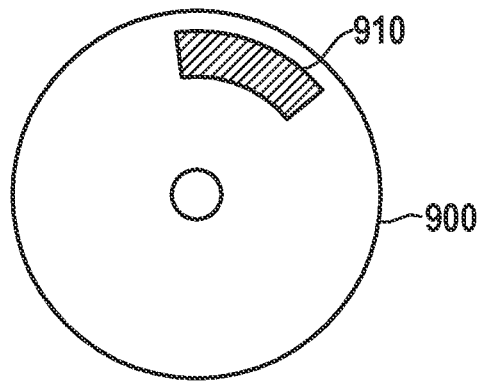
Fig. 9

MACHINE LEARNING BASED ON A PROBABILITY DISTRIBUTION OF SENSOR DATA

CROSS REFERENCE

The present application claims the benefit under 35 U.S.C. § 119 of European Patent Application No. EP 21 17 8046.5 filed on Jun. 7, 2021, which is expressly incorporated herein by reference in its entirety.

FIELD

The present invention relates to a computer-implemented method and system for training a machine learnable model for controlling and/or monitoring a computer-controlled system. The present invention further relates to a computer-implemented method and system for applying a machine learnable model for controlling and/or monitoring a computer-controlled system. The present invention further relates to a computer-readable medium.

BACKGROUND INFORMATION

Machine learning is more and more being applied in the controlling and monitoring of computer-controlled systems, such as robots, semi-autonomous or fully autonomous vehicles, domestic appliances, power tools, manufacturing machines, personal assistants, and access control systems. Such machine learning models take in sensor data of the computer-controlled system and/or its environment, for example, images of the surroundings of the vehicle being controlled, and use that sensor data to derive control signals that are then used for the control, for example, to derive a breaking signal to let the vehicle break if it is in danger of colliding with a pedestrian.

Within machine learning, techniques are gaining popularity that attempt to make inferences based on explicitly modelling the incoming sensor data as a probability distribution. Given the sensor data, and optionally additional inputs such as a label or other type of annotation, the probability distribution may provide a (normalized or non-normalized) probability of that input occurring according to the training dataset on which the model has been trained. For example, in an energy-based model, the probability may be defined as an exponential of a trainable energy function. Modelling sensor data as a probability distribution has the advantage that it allows to deal well with the uncertainty inherent in measuring sensor data. This is particularly important when using the sensor data to make automated decisions about the controlling of a computer-controlled system, e.g., to make sure that unreliable sensor data is not weighted too heavily.

A challenge of many models that are based on defining a probability distribution of their model inputs, e.g., sensor data of a computer-controlled system, is that it is needed to take samples from the probability distribution. Such sampling may be needed during the training of the model, e.g., to determine a probability distribution that accurately represents a training dataset, but may also be needed when applying the trained model. This sampling however has the problem that it is computationally very expensive, limiting the complexity of the model and the size of the training dataset for which the training and/or use of such models is feasible.

In the paper "On Contrastive Divergence Learning" by Miguel Á. Carreira-Perpiñán et al., Proceedings PMLR 2005, a technique is described to train an energy-based model. Maximum-likelihood training is performed by gradient ascent. Computing the gradient of the log-likelihood involves sampling from the probability distribution and using the sample to approximate an expected value of a derivative of the energy function by evaluating the derivative on the sample. To sample from the probability distribution Markov Chain Monte Carlo sampling is used. Markov Chain Monte Carlo is run for only a few steps, but despite this is still computationally expensive.

SUMMARY

It would be desirable to make use of machine learning models that rely on a probability distribution of sensor data in a computationally more efficient way, e.g., such that training and/or applying the machine learning model is more computationally efficient. It would also be desirable to train and use such models such that samples from the probability distribution more accurately represent the underlying sensor data, and accordingly model outputs of the machine learning model are more accurate.

In accordance with a first aspect of the present invention, a computer-implemented method and a corresponding system are provided for training a machine learnable model for controlling and/or monitoring a computer-controlled system. In accordance with a further aspect of the present invention, a computer-implemented method and a corresponding system are provided for applying a machine learnable model for controlling and/or monitoring a computer-controlled system. In accordance with an aspect of the present invention, a computer-readable medium is provided.

Various embodiments of the present invention relate to machine learnable models that make inferences based on a probability distribution of sensor data of a computer-controlled system, e.g., by determining a probability of given sensor data or generating sensor data according to the distribution. Such sensor data may represent measurements of one or more physical quantities of the computer-controlled system and/or its environment. In other words, the sensor data may represent an observation of the computer-controlled system and/or its environment. For example, the sensor data may comprise an image of the computer-controlled system and/or its environment, e.g., taken by an image camera, a video camera, a LiDAR sensor, a motion sensor, an ultrasonic sensor, etc. Instead or in addition, the sensor data may comprise a time series of measurements of the one or more physical quantities at one or more time points, for example, temperature, acceleration, pressure, etcetera. For example, a physical quantity may be directly measured by a sensor of the computer-controlled system or indirectly measured by deriving a value of the physical quantity from measurements of one or more other measured physical quantities, etcetera.

A particular class of computer-controlled systems are those in which the sensor data is subject to symmetries that are imposed by the physical quantities that they represent. In particular, due to the structure of the computer-controlled system and/or its environment, and due to the way that this structure is represented in the sensor data, a probability for a certain piece of sensor data to occur may be invariant, at least approximately, to these symmetries. For example, in an autonomous vehicle, camera images of the road in front of the vehicle may be expected to be at least approximately reflection symmetric in a vertical axis of symmetry. That is, a probability of a particular image being measured may be expected to be approximately equal to a probability for that image reflected in the axis of symmetry. Another illustrative example is a control system for a medical device that works with cells, e.g., a cell growing device. Such a control system may use images of cells, for example, by performing histological image segmentation. Such images may be rotationally invariant. More generally, the symmetries can be rotation symmetries (e.g., by straight angles or by any angle), translation symmetries, reflection symmetries, or any combination.

The symmetries can also represent more generally that a model output of the machine learnable model is expected to be at least approximately independent of the one or more symmetries. In one illustrative embodiment, the machine learnable model may be a model for detecting a pedestrian which may be translation symmetric, e.g., the model output may be independent of the position where the pedestrian occurs in the image. This can be regardless of whether each position of the pedestrian in the image is indeed equally likely. As another illustrative example, the model may be for controlling a robot arm to reach a target position. In this case, the sensor data may be rotation invariant, e.g., parameters for controlling the robot arm to reach the target position may be invariant to the rotation (e.g., acceleration) or may rotate along with the sensor data (e.g., direction to send the robot arm). For the purposes of the machine learnable model, in this case, the sensor data is considered to be translation symmetric.

The inventors realized that, by accounting for such symmetries of the sensor data, machine learnable models may be able to more efficiently represent the probability distribution of the sensor data. This can allow the probability distribution to be more efficiently learned and/or sampled from. In particular, the symmetries may be accounted for by making probability distribution invariant to the symmetries. Thus, the inventors envisaged to use the symmetries as an inductive bias when sampling from the probability distribution.

In particular, when training a machine learnable model that is based on a probability distribution of sensor data, in many cases, it is needed to take samples of the sensor data according to the probability distribution. For example, the probability distribution itself may be learnable, and the samples may be taken as part of training the probability distribution to match a training dataset, e.g., by updating the parameters of the probability distribution based on a training loss, e.g., an empirical risk minimization loss or the like. In other examples, while training the machine learnable model, the probability distribution of sensor data may be fixed, e.g., may have been trained previously, and may be used to train other components of the machine learnable model, e.g., the machine learnable model may be a Bayesian model or the like.

Interestingly, the inventors provide to sample a set of multiple such samples of sensor data in such a way that the symmetries are accounted for. Instead of using conventional sampling techniques such as Markov Chain Monte Carlo, Hamiltonian Monte Carlo, or Stochastic Gradient Langevin Dynamics, sampling may be performed according to an adapted Stein Variational Gradient Descent (SVGD)-like evolution. Initial values for the multiple samples may be sampled from a source probability distribution. The multiple samples may then be iteratively evolved. In an evolution, a selected sample may be evolved based on similarities of the selected sample to the multiple samples, that are computed according to a kernel function. The evolving may involve computing an attraction term and a repulsion term. The attraction term may be computed as a weighted sum of gradient directions of the probability distribution for the multiple samples. The repulsion term may be computed as a sum of respective gradient directions of the kernel function for the multiple samples given the selected sample.

The inventors realized that by adapting such a sampling procedure, the symmetries can be accounted for. The source probability distribution for the initial values may be configured to be invariant to the one or more symmetries, e.g., such that applying a symmetry to an initial value may not affect its probability according to the source probability distribution. Further, a kernel function may be used that is invariant or, more generally, equivariant to the one or more symmetries, e.g., first applying a symmetry and then applying the kernel function may give the result as first applying the kernel function and then applying the symmetry. Moreover, the probability distribution that is sampled from, may be configured to be invariant to the one or more symmetries. For example, the probability distribution may be defined by a trainable model that outputs a probability for an instance of sensor data, and that is configured to be invariant to the symmetries. Such models are conventional and can be used herein. The inventors were able to show that this particular way of performing a SVGD-like evolution of samples, leads to a sampling procedure that respects the symmetries. Namely, the evolution of the set of samples may be such that the density at respective iterations is invariant to symmetry transformations encoded in the kernel function.

The provided sampling procedure in accordance with an example embodiment of the present invention has several advantages over conventional sampling techniques. The inventors were able to empirically demonstrate that, in settings where the sample data has symmetries, sample efficiency is improved, a more diverse set of samples is obtained, and the sampling is more robust. In particular, an important problem of conventional sampling techniques is so-called mode collapse, that is, the tendency to generate samples from a limited set instead of samples that are representative of the probability distribution. Mode collapse was found to be greatly reduced by the provided techniques. Also convergence of the training was found to be improved since the training is helped by the inductive bias of the symmetries. Thus, though the provided techniques, higher-quality samples can be obtained in a more efficient way. As a consequence, also the training and the use of the machine learnable model that uses the probability distribution is improved. For example, the training can make more efficient use of training data, and a model can be obtained that generalizes better because of taking the symmetries into account. For example, the model may be trained on a more representative and/or more generalized set of traffic situations or other sensor data, leading to a better trained model.

In particular, compared to using regular SVGD that does not use symmetries, it was found that the provided techniques can more faithfully captures the density to be sampled from. Effectively, the equivariant kernel may take into account "long-range interactions" between samples that are similar up to symmetry. These long-range interactions were found to be particularly beneficial in the repulsion term of the iterative evolution, where they can help to avoid mode collapse. Namely, the long-range interactions may discourage different samples to lie in the same symmetry orbit. Existing techniques may not provide such an effect and therefore show a tendency of producing samples that lie in different parts of the same symmetry orbit as opposed to being spread appropriately over the probability distribution. More generally, the provided techniques were found to converge more quickly, and to converge to samples that match the probability distribution more closely, while needing fewer samples to obtain a good spread of samples over the probability distribution. Another effect that was observed is an improved robustness with respect to the sampled initial values. Existing techniques show a tendency to collapse to a few local modes that are closest to the initial distribution of the samples. Due to the long-range effect provided by the equivariant kernel function, this tendency is greatly reduced in the provided techniques. The same effects are expected in comparison to other sample techniques that do not use symmetries as well.

By applying machine learnable models trained as described herein in accordance with the present invention, the controlling and/or monitoring of various computer-controlled systems may be improved. For example, the computer-controlled system may be a robot, a vehicle, a domestic appliance, a power tool, a manufacturing machine, a personal assistant or an access control system. The techniques can allow to make more efficient and effect use of sensor data, providing more generalizable and robust results more efficiently. The computer-controlled system may be a system for conveying information, like a surveillance system or a medical system, e.g., a medical imaging system.

In some example embodiments of the present invention, the machine learnable model may be applied by obtaining sensor data of the computer-controlled system and/or its environment, and then applying the trained machine learnable model to the obtained sensor data. To this end, a probability for the sensor data may be determined according to the probability distribution. Because the machine learnable model is trained based on improved samples, model outputs obtained in this way may be better, e.g., may generalize better to the different symmetries. Consequently, also control signals determined based on the determined probability may be more accurate and/or reliable, for example. In particular, the training of the machine learnable model may involve the training of the probability distribution itself and thus directly lead to more accurate and/or robust probabilities being determined.

In some example embodiments of the present invention, the machine learnable model may be applied for the controlling and/or monitoring by using the machine learnable model as a generative model to generate multiple synthetic samples of the sensor data according to the probability distribution. These synthetic samples may then be used to train a further machine learning model for the controlling and/or monitoring, for example. Also this application of the model enjoys the advantages of using a better trained model. Interestingly, also the sampling of the sensor data to generate the synthetic samples may be performed according to the techniques herein, e.g., by sampling initial values and iteratively evolving them using the described techniques. Thus, in this case, the provided techniques may be advantageous not only because the trained model, e.g., the trained probability distribution, may better reflect the training dataset. Also, the sampling that is performed from this probability distribution may be more efficient, and samples may be obtained that are more representative of the probability distribution and so of the training data.

Optionally, a sample may represent image data, for example, two-dimensional image data or three-dimensional image data. Image data is often used for controlling and monitoring computer-controlled systems, and in many cases, images taken of the system and/or its environment exhibit symmetries that can be exploited using the techniques described herein. The one or more symmetries may include a rotation symmetry, a translation symmetry, and/or a reflection symmetry, for example. For example, the set of symmetries may be described by the two-dimensional orthogonal group O2 or special orthogonal group SO2, or the three-dimensional orthogonal group SO3 or special orthogonal group SO3. For example, the samples of sensor data may form a point cloud with 3D rotation symmetry, e.g., according to the special orthogonal group SO3.

Optionally, a sample may represent a time series of measurements of the one or more physical quantities. In this case, the symmetries can include a translation over time, for example, to represent time invariance, and/or additional symmetries that may be present in the particular physical quantities being measured, for example, when measuring a deviation from a mean, the symmetries may include a 1-D reflection or 2-D or 3-D rotations and/or reflections, etcetera.

The provided techniques in accordance with the present invention can also be applied outside of the domain of controlling and/or monitoring computer-controlled systems to other types of data according to a probability distribution that has symmetries. In particular, a sample may represent a molecule, e.g., a protein. The provided techniques may be used to generate samples representing molecular structures. The symmetries may be imposed by the biological structure of the molecules. In particular, by obtaining a target label and generating samples according to the target label, conditional molecular generation may be performed in that molecules/proteins may be generated conditioned on a desired property.

Optionally, the machine learnable model may be an energy-based model, meaning that the probability distribution used in the machine learnable model comprises an exponential of a trainable energy function. The energy-based model may be trained to be invariant to the one or more symmetries and thus account for the symmetries. The energy-based model may be trained by approximating an expected value of a derivative of the energy function. For example, the energy-based model may be trained by contrastive divergence. The training can be self-supervised learning. The expected value may be approximated by evaluating the derivative on samples according to the probability distribution. Typically, conventional sampling techniques such as SGLD or MCMC are used in the art to train energy-based models, but as discussed, this may be computationally expensive and may lead to samples that do not sufficiently accurately represent the probability distribution to be sampled from, e.g., due to mode collapse. A probability distribution may be used that is configured to be invariant to symmetries imposed by the computer-controlled system and/or its environment, for example, the probability distribution may be defined by an equivariant feedforward network. The training may involve sampling as described herein.

Accordingly, an energy-based model is provided that uses the symmetries in the sensor data as an inductive bias, and that can be trained much more efficiently by using the improved sampling procedure; in particular, it has been found that energy-based models trained as described herein provide better generalization of the training data. In particular, given only a single example configuration of a meta-stable state, an energy-based model trained as described herein may discover other possible configurations of the meta-stable states as well, as also discussed in more detailed elsewhere.

The provided techniques can be applied other types of machine learnable model apart from energy-based models as well. For example, the machine learnable model can be a Bayesian Neural Network, e.g., by utilizing permutation invariance in the network.

Optionally, the kernel function may be evaluated on a first and second sample by transforming the first and second samples according to respective symmetries; evaluating an underlying kernel function on the transformed first and second samples; and aggregating respective outputs of the underlying kernel function. This allows to use an existing kernel function that is not itself equivariant to the symmetries in combination with the techniques provided herein. Optionally, the respective symmetries may be a strict subset of the one or more symmetries imposed by the computer-controlled system and/or its environment, e.g., the aggregate be computed as a Monte Carlo approximation. This improves efficiency and allows to apply the underlying kernel function also in settings where the number of symmetries is infinite, e.g., where the symmetries include rotations over arbitrary degrees.

Optionally, the kernel function may be evaluated on a first and second sample by mapping the first and second samples to factorized first and second samples according to a mapping that is invariant to the one or more symmetries, and evaluating an underlying kernel on the factorized first and second samples. This provides an alternative way of using a kernel function that is not equivariant to the symmetries by itself.

Optionally, the kernel function may be matrix-valued. The use of a matrix-valued kernel provides more flexibility in the way different samples can be compared, e.g., dependencies may be captured that a scaler kernel does not capture. Namely, a scalar kernels may effectively look for an optimal solution in a direct product of Hilbert spaces for respective particles; the respective particles may see the same scalar kernel. With matrix-valued kernels, a vector valued Hilbert space may be considered that allows to represent interactions between the particles on the level of the kernel. In particular, a matrix-valued kernel may allow to allows to flexibly incorporate geometric information represented by various preconditioning matrices, yielding acceleration in the exploration of the probability landscape.

Optionally, in use, a probability determined by a machine learnable model trained as described herein may be used for anomaly detection, by flagging the sensor data as out-of-distribution if the probability for the sensor data is below a threshold. For example, the computer-controlled system may be controlled using a fallback control system if the sensor data is out-of-distribution and using a regular control system otherwise. Thus, safety of controlling the system may be improved by using more reliable estimates of whether or not the computer-controlled system is in an abnormal state.

Optionally, the probability distribution of the machine learnable model may represent a joint distribution of sensor data and corresponding labels, for example, the machine learnable model may be a joint energy model. For example, the assigned labels may be independent of the symmetries of the sensor data. In use, such a joint distribution may be used to assign a label to sensor data based on respective joint probabilities of the sensor data with respective labels. This way, a classifier or regression model can be obtained that incorporates symmetries in the application domain. Instead or in addition, the machine learnable model may be used for conditional generation by obtaining one or more target labels and generating the multiple synthetic samples according to the one or more target labels. Thus, for example, it is enabled to use a joint energy model to generate samples conditioned on classes, that moreover incorporates the available symmetries.

Optionally, the trained model may be used to generate synthetic sensor data for use as training and/or test data in training a further machine learnable model, for example, a neural network. For example, the sensor data may represent a traffic scene. Simulated data may be used for data augmentation, e.g., in order to train the further machine learnable model on larger datasets and/or datasets of situations for which it is hard to obtain training data, e.g., dangerous traffic situations, rare combinations of weather and/or traffic conditions, etcetera, resulting in a better machine learnable model without the need to perform further sensor data measurements.

Optionally, the model output may be output to an actuator associated with the computer-controlled system, and the processor subsystem may be configured to control the computer-controlled system by providing control data to the actuator which is based on the model output of the machine learnable model. For example, the actuator may be used to control a vehicle, such as an autonomous or semi-autonomous vehicle, a robot, a manufacturing machine, a building, etc. More generally, the system for applying the machine learnable model may be one of: a vehicle control system, a robotics control system, a manufacturing control system, a building control system. Such control systems typically deal with sensor data with symmetries and thus benefit from the provided techniques.

Optionally, the computer-implemented method or system for training a machine learnable model may further comprise any computer-implemented method or system described in this specification for applying the trained model, for example for control or monitoring of the computer-controlled system.

It will be appreciated by those skilled in the art that two or more of the above-mentioned embodiments, implementations, and/or optional aspects of the present invention may be combined in any way deemed useful.

Modifications and variations of any system and/or any computer readable medium, which correspond to the described modifications and variations of a corresponding computer-implemented method, can be carried out by a person skilled in the art on the basis of the present disclosure.

BRIEF DESCRIPTION OF EXAMPLE EMBODIMENTS

These and other aspects of the present invention will be apparent from and elucidated further with reference to the embodiments described by way of example in the following description and with reference to the figures.

FIG. 7 shows a computer-implemented method of training a machine learnable model, in accordance with an example embodiment of the present invention.

FIG. 8 shows a computer-implemented method of applying a machine learnable model, in accordance with an example embodiment of the present invention.

FIG. 9 shows a computer-readable medium comprising data, in accordance with an example embodiment of the present invention.

DETAILED DESCRIPTION OF EXAMPLE EMBODIMENTS

Figure 1:
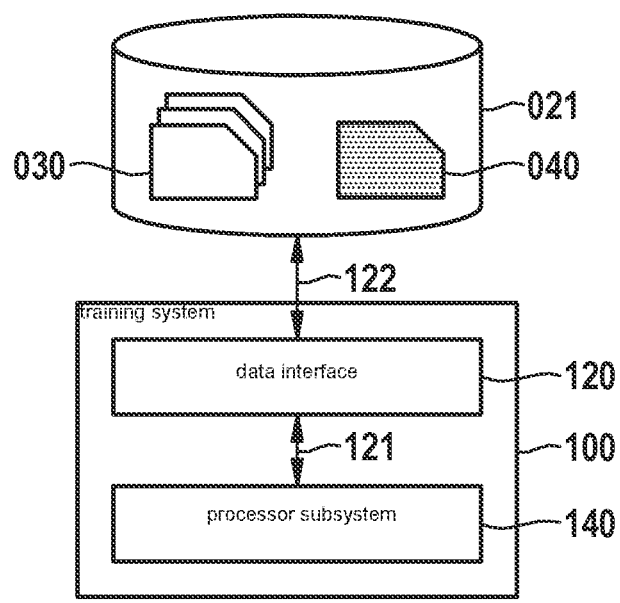
FIG. 1 shows a system for training a machine learnable model, in accordance with an example embodiment of the present invention.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 2:
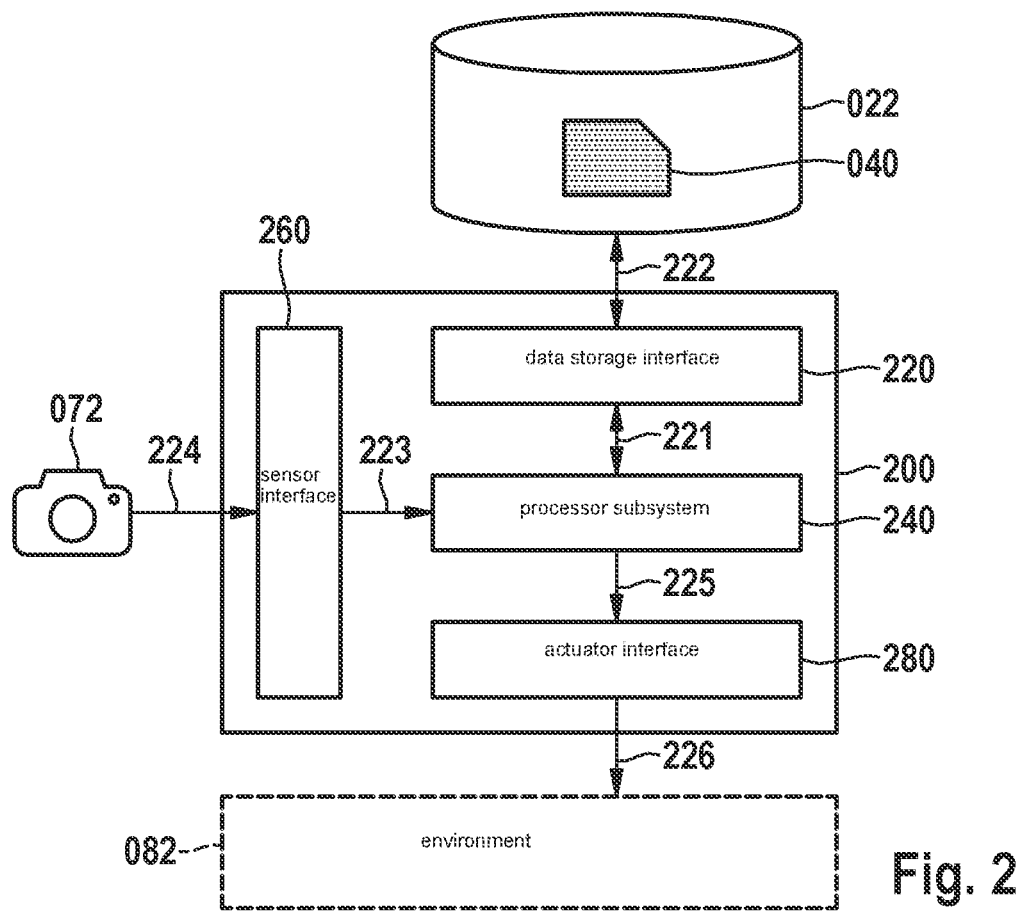
FIG. 2 shows a system for applying a machine learnable model, in accordance with an example embodiment of the present invention.
Figure 3:
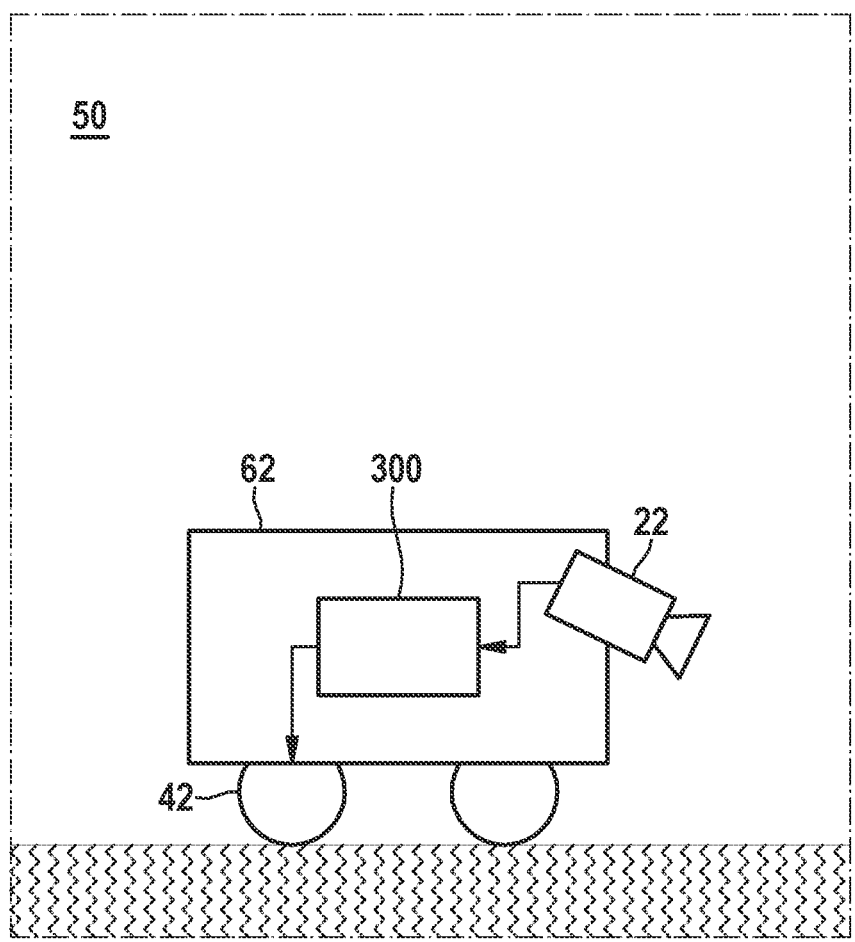
FIG. 3 shows a (semi-)autonomous vehicle having a system for applying a machine learnable model as a subsystem, in accordance with an example embodiment of the present invention.

FIG. 1 shows a system 100 for training a machine learnable model for controlling and/or monitoring a computer-controlled system, such as system 200 of FIG. 2 or system 300 of FIG. 3. The machine learnable model may be configured to make inferences based on a probability distribution of sensor data. The sensor data may represent measurements of one or more physical quantities of the computer-controlled system and/or its environment. The machine learnable model may be configured to account for one or more symmetries in the probability distribution of the sensor data imposed by the computer-controlled system and/or its environment.

The system 100 may comprise a data interface 120 for accessing model parameters 040 of the machine learnable model. The model parameters may comprise trainable parameters that define the probability distribution, e.g., weights and/or biases of an artificial neural network used to define the probability distribution. For example, the probability distribution may be represented by most or at least 1000, at most or at least 10000, or at most or at least 100000 trainable parameters. Data interface 120 may also be for accessing training data 030 for training the machine learnable model. For example, the training data 030 may comprise one or more instances of sensor data, e.g., measured from the computer-controlled system and/or its environment, e.g., at most or at least 1000 instances, at most or at least 10000 instances, or at most or at least 100000 instances. The training data 030 can be labelled or unlabelled as appropriate for the machine learning model 040 being trained. The trained model 040 may be used for controlling and/or monitoring a computer-controlled system according to a method described herein, e.g., by system 200 of FIG. 2 or system 300 of FIG. 3.

For example, as also illustrated in FIG. 1, the input interface may be constituted by a data storage interface 120 which may access the data 030, 040 from a data storage 021. For example, the data storage interface 120 may be a memory interface or a persistent storage interface, e.g., a hard disk or an SSD interface, but also a personal, local or wide area network interface such as a Bluetooth, Zigbee or Wi-Fi interface or an ethernet or fibreoptic interface. The data storage 021 may be an internal data storage of the system 100, such as a hard drive or SSD, but also an external data storage, e.g., a network-accessible data storage. In some embodiments, the data 030, 040 may each be accessed from a different data storage, e.g., via a different subsystem of the data storage interface 120. Each subsystem may be of a type as is described above for data storage interface 120.

The system 100 may further comprise a processor subsystem 140 which may be configured to, during operation of the system 100, sample multiple samples of the sensor data according to the probability distribution and to update the model parameters of the machine learnable model based on the multiple samples. The sampling may comprise sampling initial values for the multiple samples from a source probability distribution. The source probability distribution may be invariant to the one or more symmetries. The sampling may comprise iteratively evolving the multiple samples. The iteratively evolving may comprise evolving a selected sample based on similarities of the selected sample to the multiple samples. The similarities may be computed according to a kernel function. The kernel function may be equivariant to the one or more symmetries. The selected sample may be evolved by computing an attraction term and a repulsion term. The attraction term may be computed as a weighted sum of gradient directions of the probability distribution for the multiple samples. The gradient directions may be weighed according to the similarities. The probability distribution may be configured to be invariant to the one or more symmetries. The repulsion term may be computed as a sum of respective gradient directions of the kernel function for the multiple samples given the selected sample.

The system 100 may further comprise an output interface for outputting trained data 040 representing the learned (or 'trained') model. For example, as also illustrated in FIG. 1, the output interface may be constituted by the data interface 120, with said interface being in these embodiments an input/output ('IO') interface, via which the trained model data 040 may be stored in the data storage 021. For example, the model data defining the 'untrained' model may during or after the training be replaced, at least in part, by the model data of the trained model, in that the parameters of the model, such as weights and other types of parameters of a trainable probability distribution, may be adapted to reflect the training on the training data 030. This is also illustrated in FIG. 1 by the reference numeral 040 being used to refer both to the trained model and the untrained model. In other embodiments, the trained model data 040 may be stored separately from the model data defining the 'untrained' dynamics model. In some embodiments, the output interface may be separate from the data storage interface 120, but may in general be of a type as described above for the data storage interface 120.

FIG. 2 shows a system 200 for applying a machine learnable model for controlling and/or monitoring a computer-controlled system. The machine learnable model may be configured to make inferences based on a probability distribution of sensor data. The sensor data may represent measurements of one or more physical quantities of the computer-controlled system and/or its environment. The machine learnable model may be configured to account for one or more symmetries in the probability distribution of the sensor data imposed by the computer-controlled system and/or its environment. The probability distribution may be configured to be invariant to the one or more symmetries. System 200 may train the model in addition to applying it, e.g., system 200 may be combined with the system 100 of FIG. 1 into a single system.

The system 200 may comprise a data interface 220 for accessing model data 040 representing the machine learnable model. The machine learnable model may have been trained as described herein, e.g., by system 100 of FIG. 1. For example, as also illustrated in FIG. 2, the data interface may be constituted by a data storage interface 220 which may access the data 040 from a data storage 022. In general, the data interface 220 and the data storage 022 may be of a same type as described with reference to FIG. 1 for the data interface 120 and the data storage 021. Data storage 022 may be comprised in system 200.

The system 200 may further comprise a processor subsystem 240 which may be configured to, during operation of the system 200, apply the machine learnable model to obtain a model output 225. The system 200 may be further configured to output the model output for use in the controlling and/or monitoring.

In some embodiments, the applying may comprise, via a sensor interface 260 of the system, obtaining the sensor data 224 of the computer-controlled system and/or its environment, and applying the trained machine learnable model 040 to the sensor data 224 to obtain model output 225. This applying may comprise determining a probability for the sensor data according to the probability distribution. In this case, based on model output 225, control data 226 may be determined for controlling the computer-controlled system, e.g., in the form of actuator data as described in more detail elsewhere.

Instead or in addition, the applying may comprise using the machine learnable model 040 as a generative model to generate as model output 225 multiple synthetic samples of the sensor data according to the probability distribution. The model output may in this case be output e.g. via an output interface as described for FIG. 1 for training of a further machine learning model using the synthetic samples as training and/or test data. The training may be performed by system 200 itself or a different system.

It will be appreciated that the same considerations and implementation options apply for the processor subsystem 240 as for the processor subsystem 140 of FIG. 1. It will be further appreciated that the same considerations and implementation options may in general apply to the system 200 as for the system 100 of FIG. 1, unless otherwise noted.

FIG. 2 further shows various optional components of the system 200. For example, in some embodiments, the system 200 may comprise a sensor interface 260 for directly accessing sensor data 224 acquired by a sensor 072 in an environment 082. The sensor may be arranged in environment 082 but may also be arranged remotely from the environment 082, for example if the quantity(s) can be measured remotely. The sensor 072 may but does not need to be part of the system 200. The sensor 072 may have any suitable form, such as an image sensor, a lidar sensor, a radar sensor, a pressure sensor, a contain temperature sensor, etc. In some embodiments, the sensor data 072 may sensor measurements of different physical quantities in that it may be obtained from two or more different sensors sensing different physical quantities. The sensor data interface 260 may have any suitable form corresponding in type to the type of sensor, including but not limited to a low-level communication interface, e.g., based on I2C or SPI data communication, or a data storage interface of a type as described above for the data interface 220.

In some embodiments, the system 200 may comprise an actuator interface 280 for providing control data 226 to an actuator (not shown) in the environment 082. Such control data 226 may be generated by the processor subsystem 240 to control the actuator based on a model output of the machine learnable model 040. The actuator may be part of system 200. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc. Such type of control is described with reference to FIG. 3 for an (semi-) autonomous vehicle.

In other embodiments (not shown in FIG. 2), the system 200 may comprise an output interface to a rendering device, such as a display, a light source, a loudspeaker, a vibration motor, etc., which may be used to generate a sensory perceptible output signal which may be generated based on the model output of the model 040. The sensory perceptible output signal may be directly indicative of a probability determined for sensor data 224 or of generated synthetic sensor data, but may also represent a derived sensory perceptible output signal, e.g., for use in guidance, navigation or other type of control of the computer-controlled system.

In general, each system described in this specification, including but not limited to the system 100 of FIG. 1 and the system 200 of FIG. 2, may be embodied as, or in, a single device or apparatus, such as a workstation or a server. The device may be an embedded device. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit. The respective system may also be implemented in a distributed manner, e.g., involving different devices or apparatuses, such as distributed local or cloud-based servers. In some embodiments, the system 200 may be part of vehicle, robot or similar physical entity, and/or may be represent a control system configured to control the physical entity.

FIG. 3 shows an example of the above, in that the system 300 is shown to be a control system of an (semi-)autonomous vehicle 62 operating in an environment 50. The autonomous vehicle 62 may be autonomous in that it may comprise an autonomous driving system or a driving assistant system, with the latter also being referred to as a semiautonomous system. The autonomous vehicle 62 may for example incorporate the system 200 to control the steering and the braking of the autonomous vehicle based on sensor data obtained from a video camera 22 integrated into the vehicle 62. For example, the system 200 may control an electric motor 42 to perform (regenerative) braking in case the autonomous vehicle 62 may be in a dangerous traffic situation. For example, a probability for sensor data of the video camera may be determined to establish whether the sensor data is out-of-distribution; if so, a potentially dangerous traffic situation may be detected. As another example, a classifier as described herein may be used to determine whether the vehicle 62 is expected to collide with a traffic participant or whether the vehicle is in another dangerous traffic situation. The system 200 may control the steering and/or braking in response to the detection of the traffic situation, e.g., to take corresponding action to avoid collision with the traffic participant, and/or to switch control to a safe mode, etc.

Figure 4:
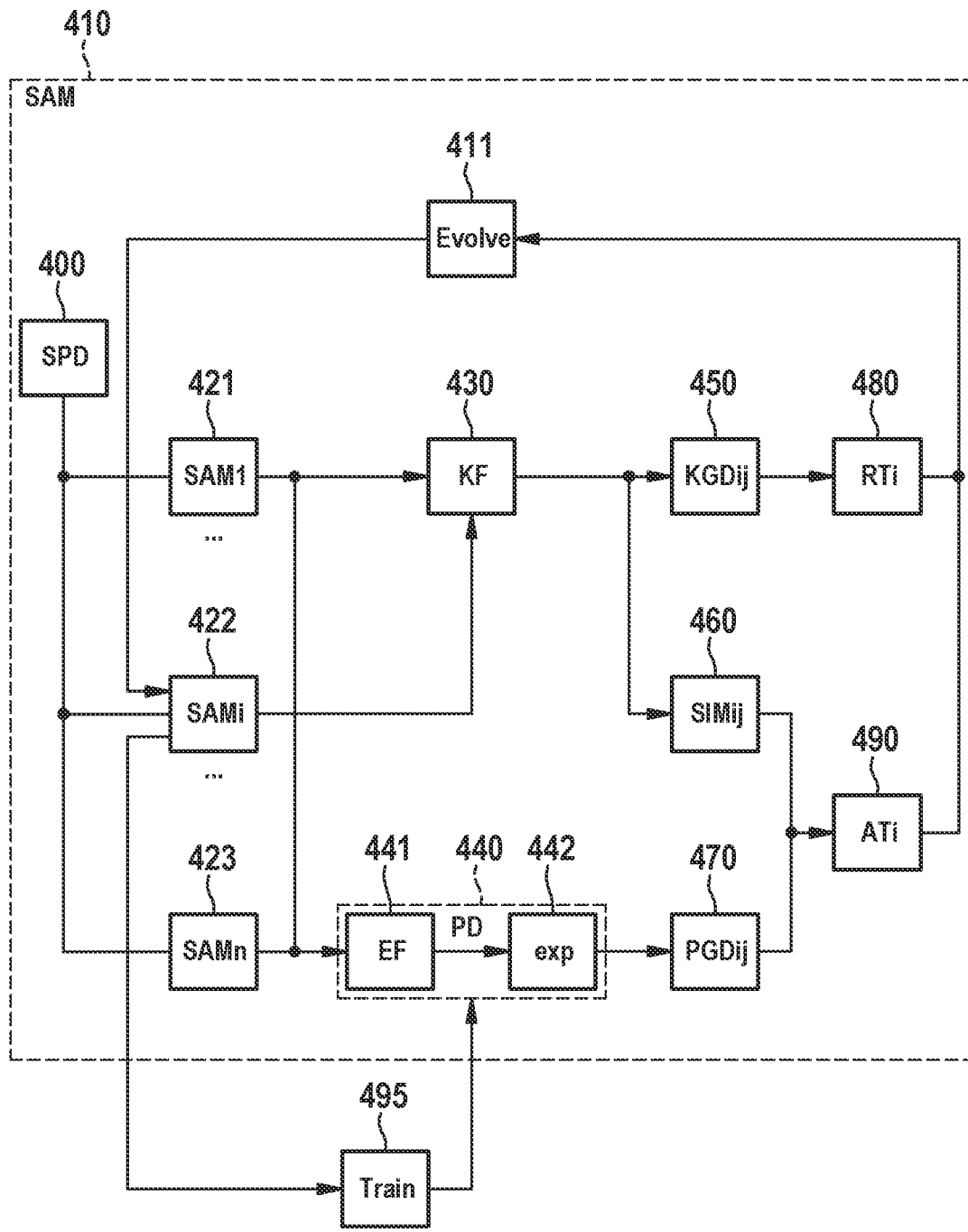
FIG. 4 shows a detailed example of how to train a machine learnable model, in accordance with an example embodiment of the present invention.

FIG. 4 shows a detailed, yet non-limiting, example of how to train a machine learnable model for controlling and/or monitoring a computer-controlled system.

The machine learnable model may be configured to make inferences based on a probability distribution PD, 440, of sensor data, e.g., as described with respect to FIGS. 6a-6dd. The sensor data may represent measurements of one or more physical quantities of the computer-controlled system and/or its environment, such as image data, as also described in more detail elsewhere. The computer-controlled system and/or its environment may impose one or more symmetries on the probability distribution of the sensor data, various examples of which are described herein. For example, the one or more symmetries may include a rotation symmetry, a translation symmetry, and/or a reflection symmetry. The probability distribution can also be a joint distribution of sensor data and corresponding labels, as also discussed in more detail with respect to FIGS. 6b and 6d.

The probability distribution PD may be configured to be invariant to the one or more symmetries. That is, the probability distribution PD may be defined in such a way, e.g., by a learnable function, that probabilities for respective sensor data inputs, e.g., samples SAMi, are invariant to the symmetries, e.g., applying a symmetry to a sensor data input may not affect the probability of the sensor data according to the probability distribution. In case the probability distribution represents a joint distribution of sensor data and corresponding labels, the symmetries may act on the sensor data but not on the labels, for example. The probability distribution PD can be defined to be invariant using techniques that are conventional, e.g., using an equivariant feedforward network.

The training of the machine learnable model may involve a sampling operation Sam, 410, that takes multiple samples of sensor data according to the probability distribution PD. For example, the number of samples taken may be at most or at least 10, at most or at least 100, or at most or at least 1000. Interestingly, compared to prior art techniques, a smaller number of samples may suffice to obtain a sufficiently comprehensive set of samples for the training.

The sampling may be performed according to a Stein Variational Gradient Descent (SVGD)-type sampling. This means that the sampling involves sampling initial values for the multiple samples SAM1, 421, . . . , SAMi, 422, . . . , SAMn, 423, from a source probability distribution SPD, 400, and then iteratively evolving the samples SAMi using an attraction term and a repulsion term as described herein. In particular, to approximate and sample from the probability distribution PD, the samples may be evolved along an optimal gradient path in a Reproducing Kernel Hilbert Space (RKHS). In keeping with the terminology used for SVGD, the samples SAMi may be referred to herein as particles. The proposed sampling techniques may be referred to as "Equivariant SVGD" since they are based on invariant probability distributions and/or an equivariant kernel function.

The source probability distribution SPD may be invariant to the one or more symmetries. For example, the source probability distribution may be the uniform distribution so that the resultant density under this equivariant transformation is always invariant regardless of the symmetries. Other source probability distributions may be used depending on the symmetries, e.g., in case of a reflection symmetry, samples may be sampled from a half-plane and then reflected according to the symmetry axis with probability one half, etc.

As shown in the figure, the sampling Sam may involve iteratively evolving the multiple samples SAMi in an operation Evolve, 411. For example, the samples may be evolved up to a maximum number of iterations, e.g., at most or at least 100, at most or at least 500, or at most or at least 2500 iterations, and/or until convergence. Interestingly, using the provided techniques, such a relatively small number of iterations may suffice for convergence.

A selected sample SAMi may be evolved based on similarities of the selected sample SAMi to the multiple samples SAMj. The similarities may be computed according to a kernel function KF, 430. The kernel function KF may be configured to be equivariant to the one or more symmetries. A mathematical treatment of equivariance of kernel functions to a group action may be found in M. Reisert et al., "Learning Equivariant Functions with Matrix Valued Kernels", Journal of Machine Learning Research 8 (2007) 385-408 (incorporated herein by reference).

The kernel function can be scalar-valued, but it is also possible to use a matrix-valued kernel function, e.g., a kernel function that outputs matrices of size at least 2×2, at least 4×4, at least 8×8, etc (which need not be square). For example, an equivariant matrix-valued kernel may be defined as follows:

$$K(x,x')=\int_{\mathcal{G}} k(x,gx')R_g g$$

where $R_g$ is a group representation and $k(\bullet,\bullet)$ is a scalar symmetric, $\mathcal{G}$-invariant function. $K(x,x')$ may be equivariant in the first argument and anti-equivariant in the second argument, leading to an equivariant matrix-valued kernel function $K(x,x')$.

Generally, the choice for a particular equivariant kernel function depends on the symmetries at hand. For example, the kernel function may comprise a Gaussian kernel and/or an RBF kernel, e.g., in case of rotation and/or reflection symmetries, or a uniform kernel may be used. It is also possible to use a kernel function KF based on an underlying kernel function that is not itself equivariant; examples are discussed with respect to FIGS. 5a and 5b.

The evolution of the selected sample SAMi may be based on an attraction term ATi, 490. The attraction term ATi may be as a weighted sum of gradient directions PGDij, 470 of the probability distribution PD for the multiple samples SAMj. For example, when using an energy function, a gradient direction for a respective sample SAMj may be a gradient of the energy function with respect to the respective sample. The gradient directions PGDij may be weighed according to similarities SIMij, 460 between the sample SAMi and the respective samples SAMj according to the kernel function KF.

The evolution of the selected sample SAMi may be further based on a repulsion term RTi, 480. The repulsion term RTi may be computed as a sum of respective gradient directions KGDij, 450, of the kernel function KF for the multiple samples SAMj given the selected sample SAMi, e.g., the gradient of the kernel function KF with respect to the respective samples SAMj evaluated while keeping the selected sample SAMi fixed.

Evolving Evolve the selected sample SAMi may be performed as a Monte Carlo sum over the contributions RTi, ATi of the respective samples SAMj.

A detailed mathematical description of evolving samples according to an attraction term ATi and a repulsion term RTi is now given.

Let $\mathcal{G}$ be a group acting on $R^d$ through a representation $R: \mathcal{G} \to GL(d)$ where $GL(d)$ is the general linear group on $R^d$, such that $\forall g \in \mathcal{G}$, $g \to R_g$. Given a target random variable $X \subseteq R^d$ with density $\pi$, $\pi$ may be defined as $\mathcal{G}$-invariant if $\forall g \in \mathcal{G}$ and $x \in R^d$, $\pi(R_g x) = \pi(x)$. Additionally, a function $f(\bullet)$ may be defined as $\mathcal{G}$-equivariant if $\forall g \in \mathcal{G}$ and $x \in R^d$, $f(R_g x) = R_g f(x)$. Notation $\mathcal{O}(x)$ may be used to denote an orbit of an element $x \in X$ defined as $\mathcal{O}(x) := \{x' : x' = R_g x, \forall g \in \mathcal{G}\}$. $\pi_{|\mathcal{G}}$ may be referred to as a factorized density of a $\mathcal{G}$-invariant density $\pi$ where $\pi_{|\mathcal{G}}$ has support on the set $X_{|\mathcal{G}} := \{x : x \neq R_g x', \forall x' \in X_{|\mathcal{G}}, \forall g \in \mathcal{G}\}$, the elements of which are indexing the orbits.

To perform sampling Sam, a SVGD-type sampling technique may be used. Generally speaking, SVGD may provide a particle optimization variational inference method that combines the paradigms of sampling and variational inference for Bayesian inference problems. In SVGD-type sampling, samples may be considered as a set n particles $\{x_i\}_{i=1}^n \in X \subseteq R^d$ that may be evolved following a dynamical system to approximate a target (posterior) density, e.g., $\pi(x) \propto \exp(-E(x))$ where $E(\bullet)$ is an energy function. This is achieved by iteratively evolving the samples, e.g., by performing a series of T discrete steps that transform the set of particles $\{x_i^0\}_{i=1}^n \sim q_0(x)$ sampled from a base distribution SPD, $q_0$ (e.g., Gaussian) at t=0 using the map $x' = T(x) := x^{s-1} + \varepsilon \cdot \Psi(x^{t-1})$ where $\varepsilon$ is a step size and $\Psi(\bullet)$ is a velocity field. The velocity field $\Psi(\bullet)$ may be chosen to decreases the KL divergence between the push-forward density $q_t(x) = T_\# q_{t-1}(x)$ and the target $\pi(x)$, e.g., to achieve a maximal decrease in the ML divergence.

For example, $\Psi$ may be restricted to the unit ball of an RKHS $\mathcal{H}_k^d$ with positive definite kernel $k : R^d \times R^d \to R$, in which the direction of steepest descent that maximizes the negative gradient of the KL divergence may be given by:

$$\Psi^*_{q,\pi}(x) := \arg\,max_{\Psi \in \mathcal{H}_k^d} -\nabla_\varepsilon KL(q\|\pi)|_{\varepsilon \to 0} = \mathbb{E}_{x \sim q} [\text{trace}(\mathcal{A}_\pi \Psi(x))] \quad (2)$$

where $\mathcal{A}_\pi \Psi(x) = \nabla_x \log \pi(x) \Psi(x)^T + \nabla_x \Psi(x)$ is the Stein operator.

An iterative evolution based on this principle may be implemented wherein a set of samples $\{x_1^0, x_2^0, \ldots, x_n^0\} \sim q_0$ are transformed to approximate the target density $\pi(\bullet)$ using the update $\Psi^*_{q,\pi}(x) \propto E_{x' \sim q}[\mathcal{A}_\pi k(x', x)]$. Since $\mathcal{A}_\pi \Psi(x) = \nabla_x [\pi(x)\Psi(x)]/\pi(x)$, it holds that $E_{x \sim \pi}[\mathcal{A}_\pi \Psi(x)] = 0$ for any $\Psi$ implying convergence when $q = \pi$. An iterative evolution Evolve based on the multiple updates may be obtained by computing a Monte Carlo sum over the current set of samples, e.g.:

$$x_i^{t+1} \leftarrow x_i^t + \varepsilon \Psi^*(x_i^t), \text{ where } \Psi^*(x_i^t) := \frac{1}{n} \sum_{j=1}^n \Big( \underbrace{\nabla_{x_j^t} \left( x_j^t, x_i \right)}_{\text{repulsion term}} - \underbrace{k(x_j^t, x_i) \cdot \nabla_{x_j^t} E(x_j^t)}_{\text{attraction term}} \Big).$$

As this example demonstrates, SVGD-type sampling may encourage diversity among particles by exploring different modes in the target distribution $\pi$ through a combination of the attraction term, which may attract particles to high density regions using the score function; and the repulsion term, which may ensure that the particles do not collapse together. As can be seen in the above example, in the continuous time limit, e.g., as $\varepsilon \to 0$, an iterative update of samples according to an attraction and repulsion term may correspond to a system of ordinary differential equations describing the evolution of particles $\{x_1^0, x_2^0, \ldots, x_n^0\}$ according to a differential equation, e.g., $$\frac{x}{r} = \Psi^*(x).$$

Whereas the above example uses a scalar-valued kernel function KF, it is possible to compute the attraction term ATi and repulsion term RTi based on a matrix-valued kernel function KF as well. In this case, evolution Evolve may be computed as:

$$x_i^{t+1} \leftarrow x_i^t + \frac{\varepsilon}{n} \sum_{j=1}^n \left( \nabla_{x_j^t} K(x_j^t, x_i) - K(x_j^t, x_i) \cdot \nabla_{x_j^t} E(x_j^t) \right)$$

where $K(x, x')$ is a matrix valued kernel. Interestingly, by using a matrix-valued kernel function, it is possible to flexibly incorporate various preconditioning matrices yielding acceleration in the exploration of the given the probability landscape.

Interestingly, it may be shown that, when using an invariant source distribution, an equivariant kernel function, and an invariant target distribution, the evolution Evolve as described above leads to samples that take into account the give symmetries. Mathematically, this may be phrased as follows: let $\pi$ be a $\mathcal{G}$-invariant density and $x_1^0, x_x^0, \ldots, x_n^0 \sim q_0$ be a set of particles at t=0 with $q_0$ being $\mathcal{F}$-invariant where $\mathcal{F} > \mathcal{G}$. Then, the iterative update above using a scalar-valued kernel function is $\mathcal{G}$-equivariant and the density $q_{t+1}$ defined by it at time t+1 is $\mathcal{G}$-invariant if the positive definite kernel $k(\bullet, \bullet)$ is $\mathcal{G}$-invariant. The same holds for the update with the matrix-valued kernel function if $K(\bullet, \bullet)$ is $\mathcal{G}$-equivariant. This may be realized as follows. Since the initial distribution $q_0$ is $\mathcal{F}$-invariant, by applying a known lemma, the provided update formula is $\mathcal{G}$-equivariant if $\Psi$ is $\mathcal{G}$-equivariant. If $k(\bullet, \bullet)$ is $\mathcal{G}$-invariant then $\nabla_x k(\bullet, x)$ is $\mathcal{G}$-equivariant. Furthermore, since $\pi = \exp(-E(x))$ is $\mathcal{G}$-invariant, $\nabla_x E(x)$ is also $\mathcal{G}$-equivariant. Thus, both the terms for $\Psi$ are $\mathcal{G}$-equivariant if $k(\bullet, \bullet)$ is $\mathcal{G}$-equivariant making the update $\mathcal{G}$-equivariant. The result follows similarly for the matrix-based update when K(•,•) is $\mathcal{G}$-equivariant.

Optionally, the evolving Evolve of the samples may involve adding noise. This can help to alleviate a tendency of the sampler to favour particular modes. Such a tendency may arise, for example, if the group-factorized space is multi-modal.

Alternatively, such a tendency may be alleviated by applying an annealing strategy. The annealing may comprise progressively lowering a temperature of the particles and thus decreasing their kinetic energy. Initially the high kinetic energy, e.g., noise, can help to reach different parts of the data distribution, e.g., different wells. The output of the evolution may correspond to a zero-temperature value that is obtained by ramping down the temperature during training.

As shown in the figure, the evolved samples SAMi may be used, in a training operation Train, 495, to update model parameters of the machine learnable model based on the multiple samples SAMi. In particular, the updating may involve updating learnable parameters of the probability distribution PD if this probability distribution is being trained. This is not necessary however, e.g., the probability distribution may remain fixed.

In particular, as shown in the figure, the machine learnable model being trained may be an energy-based model. In this case, the probability distribution PD may comprise a trainable energy function EF, 441, of which an exponential exp, 442 may be taken, e.g., energy function $E_\theta(x):R^d \to R$ may define a probability distribution PD as $\tilde{\pi}_\theta(x)=\exp(-E_\theta(x))/Z_\theta$, where $Z_\theta=\int \exp(-E_\theta(x))x$ is a normalization constant, e.g., a partition function. Energy models may be less restrictive than other tractable density models in the parameterization of the functional form of $\tilde{\pi}_\theta(\bullet)$, e.g., the energy function EF may not integrate to one. Accordingly, in an energy-based model the energy function EF may generally be parameterized by any trainable nonlinear function.

To take into account symmetries, energy function EF may be a trainable equivariant model as is conventional, such as an equivariant feedforward network. Thus, a $\mathcal{G}$-invariant probability distribution PD may be represented by encoding symmetries into the energy-based model. For example, for the energy function EF, an equivariant deep network may be used as is conventional, e.g., an equivariant deep neural network.

The energy-based model may be trained Train on a training dataset, e.g., comprising samples $x_1, x_2, \ldots, x_n \subseteq R^d$. The training may be self-supervised, but supervised training is also possible as discussed e.g., with respect to FIG. 6b. The training goal may be to maximize the log-likelihood of the data under the given model, e.g.:

$$\theta^*:=\arg\min_\theta \mathcal{L}_{ML}(\theta)=\mathbb{E}_{x \sim \pi}[-\log \tilde{\pi}_\theta(x)].$$

For many practical choices of $E_\theta(\bullet)$, evaluating the partition function $Z_\theta$ may be intractable, making maximum likelihood estimation difficult to perform. Thus, the training Train may be performed by approximating an expected value of a derivative of the energy function EF by evaluating the derivative on the evolved multiple samples SAMi, e.g., by evaluating $$\mathbb{E}_{x^- \sim \tilde{\pi}_\theta}[\nabla_\theta E_\theta(x^-)]$$

on samples $x^- \sim \tilde{\pi}_\theta$. This can avoid the need to compute $Z_\theta$. For example, using contrastive divergence training, the gradient of $\nabla_\theta \mathcal{L}_{ML}(\theta)$ may be estimated as follows:

$$\nabla_\theta \mathcal{L}_{ML}(\theta) \approx \mathbb{E}_{x^+ \sim \pi}[\nabla_\theta E_\theta(x^+)] - \mathbb{E}_{x^- \sim \tilde{\pi}_\theta}[\nabla_\theta E_\theta(x^-)].$$

Thus, by using the more efficient sampling Sam, an improved training Train of the energy-based model is obtained. Intuitively, the gradient $\nabla_\theta \mathcal{L}_{ML}(\theta)$ described above may drive the model such that it assigns higher energy to the negative samples $x^-$ sampled from the current model and decreases the energy of the positive samples $x^+$ which are the data-points from the target distribution. Since the above training of the energy-based model using MLE may use sampling from the current probability distribution $\tilde{\pi}(\theta)$, PD, it is particularly beneficial to use sampling strategies that lead to faster mixing. Interestingly, by providing an invariant energy function EF, the proposed sampling techniques Sam can provide more efficient training of the energy-based model.

Generally, the updating of the model parameters Train may be performed using techniques that are conventional. Training may be performed using stochastic approaches such as stochastic gradient descent, e.g., using the Adam optimizer as disclosed in Kingma and Ba, "Adam: A Method for Stochastic Optimization" (available at https://arxiv.org/abs/1412.6980 and incorporated herein by reference). As is conventional, such optimization methods may be heuristic and/or arrive at a local optimum. Training may be performed on an instance-by-instance basis or in batches, e.g., of at most or at least 64 or at most or at least 256 instances.

For example, the training of an energy-based model may be implemented as:

---
Algorithm. Equivariant EBM training

Input: $\{x_1^+, x_2^+, \ldots, x_m^+\} \sim \pi(x)$
while not converged do
  ▷ Generate samples from current model $E_\theta$
  $\{x_1^-, x_2^-, \ldots, x_m^-\}$ = EquivariantSVGD($E_\theta$);
  ▷ Optimize objective $\mathcal{L}_{ML}(\theta)$:
  $\Delta\theta \leftarrow \Sigma_{i=1}^m \nabla_\theta E_\theta(x_i^+) - \nabla_\theta E_\theta(x_i^-)$;
  ▷ Update $\theta$ using $\Delta\theta$ and Adam optimizer
end

---

Figure 5A:
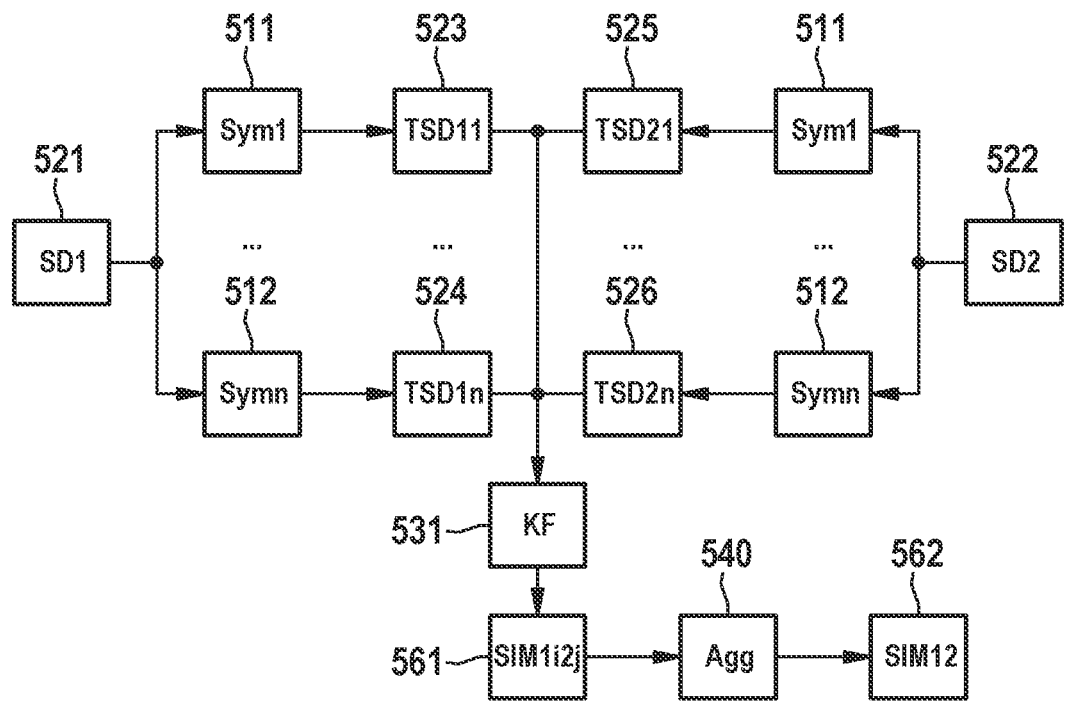
FIG. 5A shows a detailed example of how to evaluate a kernel function by transforming samples according to respective symmetries, in accordance with an example embodiment of the present invention.
Figure 5B:
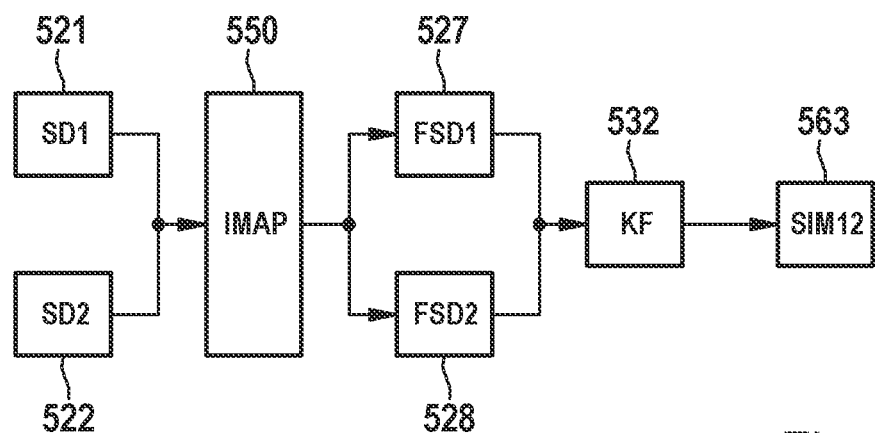
FIG. 5B shows a detailed example of how to evaluate a kernel function by mapping samples to factorized samples, in accordance with an example embodiment of the present invention.

FIG. 5a shows a detailed, yet non-limiting, example of how to evaluate a kernel function that is equivariant to a set of symmetries. In this example, the samples may be transformed according to respective symmetries. This example can be applied for example to obtain a kernel function that is equivariant to 2D rotations, 3D rotations, permutations, translations, and/or finite group structures. The example applies both to scalar-valued and to matrix-valued kernel functions.

Shown in the figure are a first sample SD1, 521, and a second sample SD2, 522, on which the kernel function is to be evaluated.

In this example, an underlying kernel function KF, 531, is used that by itself may be non-equivariant, e.g., non-invariant, to the set of symmetries.

To use the underlying kernel function KF, the first and second samples SD1, SD2, may be transformed according to respective symmetries Sym1, 511, Symn, 512, to obtain transformed first and second samples TSD11, 523, . . . , TSD1n, 524, TSD21, 525, . . . , TSD2n, 526. The underlying kernel function KF may then be applied to the transformed first and second samples TSDij to obtain respective outputs SIM1$i$2$j$, 561 representing similarities of the transformed samples. The respective outputs SIM1$i$2$j$ may then be aggregated to obtain the output SIM12, 562, of the overall kernel function representing a similarity of samples SD1, SD2. Effectively, the equivariant kernel may be constructed by a summation of all points under an orbit.

For example, an equivariant, in particular, invariant, scalar-value kernel may be constructed as follows. Let $\mathcal{G}$ be a finite group acting on $R^d$ with representation R such that $\forall g \in \mathcal{G}$, $g \rightarrow R_g$. The overall $\hat{\mathcal{T}}$-invariant kernel function may be defined as $$k_{\mathcal{G}}(x,x') = \Sigma_{x \in \mathcal{O}(x)} \Sigma_{x' \in \mathcal{O}(x')} k(x,x')$$

based on a positive-definite underlying kernel function $k(\bullet,\bullet)$.

It is possible to take an aggregate only over a strict subset of the one or more symmetries. In this case, the equivariant kernel function may be approximately equivariant, in which case the provided techniques still work. For example, a Monte Carlo approximation of aggregating over all symmetries may be used. This way, for example, the kernel function may be computed for infinite, e.g., continuous, symmetry groups. Also for symmetry groups that are finite but large, this can give a significant efficiency improvement.

FIG. 5$b$ shows a detailed, yet non-limiting, example of how to evaluate a kernel function by mapping samples to factorized samples. Also this example applies to a wide range of sets of symmetries, in particular, both to finitely many symmetries and to infinitely many symmetries, e.g., according to a continuous symmetry group, and can be used for both for scalar-valued and for matrix-valued kernel functions.

Shown in the figure are a first sample SD1, 521, and a second sample SD2, 522, on which the kernel function is to be evaluated. An underlying kernel function KF, 531, is used that by itself may itself be non-equivariant, e.g., non-invariant, to the set of symmetries. In this example, the underlying kernel function KF may be used by mapping IMAP, 550, the first and second samples SD1, SD2 to factorized first and second samples FSD1, 527, FSD2, 528, according to a mapping that is invariant to the one or more symmetries. Which particular mapping to use, depends on the set of symmetries. The underlying kernel function KF may then be evaluated on the factorized first and second samples FSD1, FSD2 to obtain the kernel function output SIM12, 563. Thus, effectively, the kernel function KF may be evaluated in the factorized space $X_{|\mathcal{G}}$.

As an example, the set of symmetries may be SO(2) for sensor data $x \in R^2$. Here, an orbit of a piece of sensor data may be given by $\mathcal{O}(x):=\{x':\|x\|=\|x'\|\}$. In this example, it is possible to sample from $\pi$ using a Monte Carlo approximation as discussed with respect to FIG. 5$a$, e.g., by sampling random rotations on a unit sphere, e.g.:

$$k_{\mathcal{G}}(x,x') = \Sigma_{i,j=1}^n k(g_i x, g_j x'), g_i, g_j \in \mathcal{G} \; \forall (i,j) \in [n] \times [n]$$

Using the techniques of FIG. 5$b$, a mapping $\Phi_{\mathcal{G}}$ $\mathcal{G}$ :$R^2 \rightarrow R$ may be used such that $\Phi_{\mathcal{G}}(x) = \|x\|$. $\Phi_{z,\hat{T}}(x)$ is SO(2) invariant since $\Phi^{\mathcal{G}}(gx) = \Phi^{\mathcal{G}}(x)$, $\forall g \in \mathcal{G}$. Thus, the overall kernel function may be defined based on an underlying kernel function k as follows:

$$k_{\mathcal{G}}(x,x') = k(\Phi^{\mathcal{G}}(x), \Phi^{\mathcal{G}}(x')).$$

FIG. 6$a$ shows a detailed, yet non-limiting, example of how to apply a machine learnable model to determine a probability for sensor data.

The figure shows sensor data SD, 620, e.g., obtained via a sensor interface as discussed with respect to FIG. 1$b$. A machine learnable model trained as described herein may be applied to the sensor data SD. In this figure, the machine learnable model is an energy-based model comprising a trained probability distribution PD, 640, defined by taking an exponential exp, 642, of an energy function EF, 641. In this case and more generally, applying the machine learnable model may comprise determining a probability P, 630, for the sensor data according to the probability distribution.

For example, the probability P may correspond to a similarity of the sensor data SD to the training dataset on which the machine learnable model was trained. For example, the probability P may be used for anomaly detection by flagging the sensor data SD as out-of-distribution if the probability P is below a threshold.

FIG. 6$b$ shows a detailed, yet non-limiting, example of how to apply a machine learnable model to determine a probability for sensor data. This example is similar to that of FIG. 6$a$, e.g., the machine learnable model may be an energy-based model where the probability distribution PD, 640 is defined as an exponential exp, 642, of an energy function EF, 641.

In this figure, the probability Pi that is determined, is a joint probability for the sensor data SD, 620, jointly with a label Li, 650. Thus, the machine learnable model may be based on a joint probability distribution of sensor data with corresponding labels. A label may be assigned to the sensor data SD based on respective joint probabilities Pi of the sensor data with respective labels Li. For example, the labels can be classification labels, e.g., two or more classification labels, e.g., at most or at least five classification labels, or at most or at least ten classification labels. The labels can also be regression labels, for example. Thus, based on the joint probabilities Pi, a classification output or a regression output may be determined. It is also possible to use the probabilities Pi for anomaly detection as discussed with respect to FIG. 6$a$. An equivariant energy-based model using such a joint probability distribution may be referred to as an equivariant joint energy model.

Mathematically, let $\{(x_1, y_1), (x_2, y_2), \ldots, (x_n, y_n)\} \subseteq R^d \circ$ [K] be a set of samples with observations $x_i$ and labels $y_i$. Given a parametric function $f_\theta: R^d \rightarrow R^k$, a classifier may use the conditional distribution $\pi_\theta(y|x) \propto \exp(f_\theta(x)[y])$ to determine respective probabilities Pi, where $f_\theta(x)[y]$ is the logit corresponding to the $y^{th}$ class label. This may correspond to applying a softmax layer on top of the energy-based model. The logits may be used to define the joint density $\pi_\theta(x,y)$ and marginal density $\pi_\theta(x)$ as follows:

$$\tilde{\pi}_\theta(x, y) = \frac{\exp(f_\theta(x)[y])}{Z_\theta}, \text{ and } \tilde{\pi}_\theta(x) = \frac{\Sigma_y \exp(f_\theta(x)[y])}{Z_\theta}$$

Thus, an energy function corresponding to this joint probability distribution at a point x may be defined as $E_\theta = -\log \Sigma_y \exp(f_\theta(x)[y])$, where the joint energy function EF may be defined as $E_\theta(x,y) = -f_\theta(x)[y]$.

The joint probability distribution $\pi(x,y)$ may be invariant to one or more symmetries $\mathcal{G}$ that act on the sensor data but leave the label unchanged, e.g., $\pi(R_g x, y) = \pi(x, y)$, $\forall g \in \mathcal{G}$. An example is image data where the class label does not change if the image is rotated by an angle. By using a function $f_\theta$ that is $f_G$-equivariant, a $f_G$-invariant joint probability density $\tilde{\pi}_\theta(x, y)$, PD, can be obtained. It is noted that also the marginal density $\tilde{\pi}_\theta(x)$ and conditional density $\tilde{\pi}_\theta(y|x)$ may be $f_G$-invariant in the input x in this case.

An equivariant joint energy model may be trained by maximizing its log-likelihood based on a supervised loss, e.g., a cross-entropy loss in case of classification, and on an unsupervised loss that can be trained as described with respect to FIG. 4, e.g.:

$$\mathcal{L}(\theta) := \mathcal{L}_{ML}(\theta) + \mathcal{L}_{SL}(\theta) = \log \tilde{\pi}_\theta(x) + \log \tilde{\pi}_\theta(y|x)$$

where $\mathcal{L}_{SL}(\theta)$ is a supervised loss, e.g., the cross-entropy loss in the case of classification. The equivariant joint energy model may trained by applying the gradient estimator of FIG. 4 for log $\tilde{\pi}_\theta(x)$ and evaluating the gradient of the supervised loss, e.g., log $\tilde{\pi}_\theta(y|x)$, through back-propagation.

An equivariant joint energy model may also be trained by semi-supervised learning, e.g., $\mathcal{L}_{SL}((\theta)$ in the above example may be substituted with the appropriate supervised loss, e.g., mean squared error for regression.

Figure 6A:
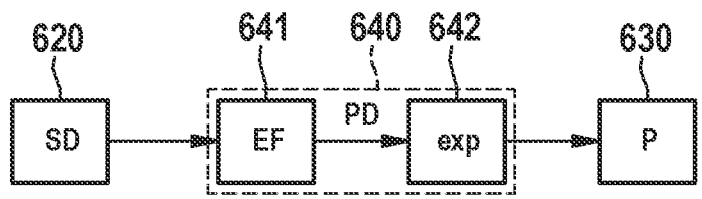
FIG. 6A shows a detailed example of how to apply a machine learnable model to determine a probability for sensor data, in accordance with an example embodiment of the present invention.
Figure 6B:
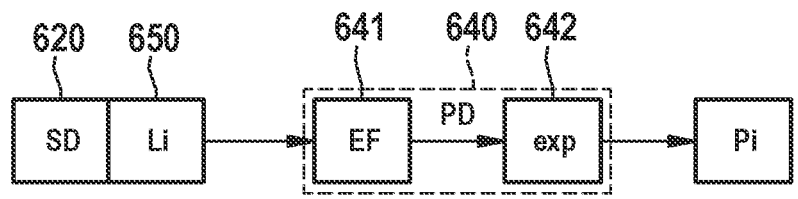
FIG. 6B shows a detailed example of how to apply a machine learnable model to determine a probability for sensor data jointly with a label, in accordance with an example embodiment of the present invention.
Figure 6C:
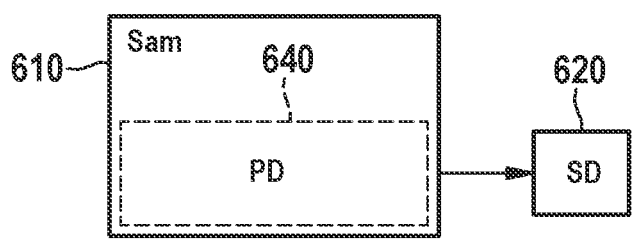
FIG. 6C shows a detailed example of how to apply a machine learnable model to generate sensor data, in accordance with an example embodiment of the present invention.

FIG. 6c shows a detailed, yet non-limiting, example of how to apply a machine learnable model to generate sensor data.

This example may use a machine learning model trained as described herein, e.g., as discussed with respect to FIG. 4. In particular, the machine learning model may be configured to make inferences based on a probability distribution PD, 640, that is configured to be invariant to one or more symmetries. For example, the machine learning model can be an energy-based model.

In this example, the machine learning model may be used as a generative model to generate multiple synthetic samples SD, 620, of the sensor data according to the probability distribution PD. Interestingly, to generate the samples, the equivariant SVGD-type sampling procedure Sam, 610, of FIG. 4 may be used, e.g., initial values for the samples may be iteratively evolved using an equivariant kernel function, an attraction term, and a repulsion term, as discussed with respect to FIG. 4. Thus, the samples SD may benefit not only from the probability distribution PD being more accurate, but also from the sampling Sam being more efficient and/or more accurate.

For example, the samples SD may be used to train a further machine learning model for controlling and/or monitoring of a computer-controlled system as is conventional. The generated multiple synthetic samples SD may be used as training and/or test data.

Figure 6D:
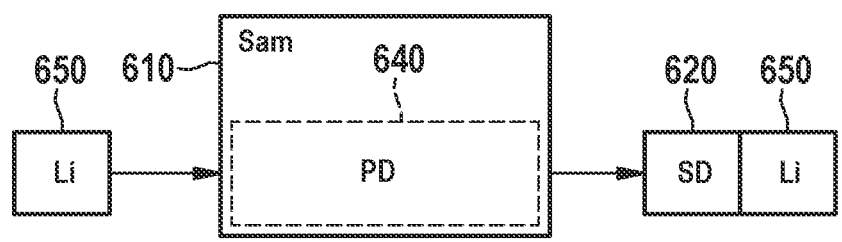
FIG. 6D shows a detailed example of how to apply a machine learnable model to generate sensor data according to a target label, in accordance with an example embodiment of the present invention.

FIG. 6d shows a detailed, yet non-limiting, example of how to apply a machine learnable model to generate sensor data according to a target label. This example is based on FIG. 6c. Also in this example, the sampler Sam, 610, of FIG. 4 may be applied to a machine learning model using a probability distribution PD, 640, trained as discussed with respect to FIG. 4, to generate multiple synthetic samples SD of the sensor data.

In this example, the probability distribution PD may represent a joint distribution of sensor data and corresponding labels Li, 650, e.g., classification or regression labels, as discussed with respect to FIG. 6b. Accordingly, the sensor data SD may be generated conditionally on the labels Li. One or more target labels may be obtained, and the multiple synthetic samples SD may be generated according to the one or more target labels Li. For example, the synthetic samples SD may all have the same target label, or respective target labels may be used for the respective samples. As also discussed with respect to FIG. 6d, a joint energy model may provide a conditional density p(x|y) of sensor data given labels based on which the sensor data SD may be generated.

FIG. 7 shows a block-diagram of computer-implemented method 700 of training a machine learnable model for controlling and/or monitoring a computer-controlled system. The machine learnable model may be configured to make inferences based on a probability distribution of sensor data. The sensor data may represent measurements of one or more physical quantities of the computer-controlled system and/or its environment. The machine learnable model may be configured to account for one or more symmetries in the probability distribution of the sensor data imposed by the computer-controlled system and/or its environment. The method 700 may correspond to an operation of the system 100 of FIG. 1. However, this is not a limitation, in that the method 700 may also be performed using another system, apparatus or device.

The method 700 may comprise, in an operation titled "SAMPLE SENSOR DATA", sampling 710 multiple samples of the sensor data according to the probability distribution. The sampling may comprise, in an operation titled "SAMPLE INITIAL VALUES", sampling 720 initial values for the multiple samples from a source probability distribution. The source probability distribution may be invariant to the one or more symmetries. The sampling may comprise, in an operation titled "EVOLVE SAMPLES", iteratively evolving 730 the multiple samples. The iterative evolving may comprise evolving a selected sample based on similarities of the selected sample to the multiple samples. The similarities may be computed according to a kernel function. The kernel function may be equivariant to the one or more symmetries. The selected sample may be evolved by computing an attraction term and a repulsion term. The attraction term may be computed 740 in an operation titled "COMPUTE ATTRACTION" as a weighted sum of gradient directions of the probability distribution for the multiple samples. The gradient directions may be weighed according to the similarities. The probability distribution may be configured to be invariant to the one or more symmetries. The repulsion term maybe computed 750 in an operation titled "COMPUTE REPULSION" as a sum of respective gradient directions of the kernel function for the multiple samples given the selected sample. The method may further comprise, an operation titled "UPDATE MODEL", updating 760 model parameters of the machine learnable model based on the multiple samples.

FIG. 8 shows a block-diagram of computer-implemented method 800 of applying a machine learnable model for controlling and/or monitoring a computer-controlled system. The machine learnable model may be configured to make inferences based on a probability distribution of sensor data. The sensor data may represent measurements of one or more physical quantities of the computer-controlled system and/or its environment. The machine learnable model may be configured to account for one or more symmetries in the probability distribution of the sensor data imposed by the computer-controlled system and/or its environment. The probability distribution may be configured to be invariant to the one or more symmetries. The method 800 may correspond to an operation of the system 200 of FIG. 2. However, this is not a limitation, in that the method 800 may also be performed using another system, apparatus or device.

The method 800 may comprise, in an operation titled "ACCESS MODEL", accessing model data representing the machine learnable model. The machine learnable model may have been previously trained, either as part of method 800 or not, according to the techniques described herein.

The method 800 may further comprise, in an operation titled "APPLY MODEL", applying 820 the machine learnable model to obtain a model output.

The applying 820 may comprise, in an operation titled "OBTAIN SENSOR DATA", obtaining 830 the sensor data of the computer-controlled system and/or its environment. The applying 820 may further comprise, in an operation titled "APPLY MODEL TO SENSOR DATA", applying 840 the trained machine learnable model to the sensor data. The applying 840 may comprise determining a probability for the sensor data according to the probability distribution.

Instead of or in addition to the obtaining 830 and the applying 840, the applying 820 may comprise, in an operation titled "GENERATE SYNTHETIC SAMPLES", using 850 the machine learnable model as a generative model to generate multiple synthetic samples of the sensor data according to the probability distribution.

The method 800 may further comprise, in an operation titled "OUTPUT MODEL OUTPUT", outputting 860 the model output for use in the controlling and/or monitoring.

It will be appreciated that, in general, the operations of method 700 of FIG. 7 and method 800 of FIG. 8 may be performed in any suitable order, e.g., consecutively, simultaneously, or a combination thereof, subject to, where applicable, a particular order being necessitated, e.g., by input/output relations. Some or all of the methods may also be combined, e.g., method 800 of applying a trained model may be applied subsequently to this trained model being trained according to method 700.

The method(s) may be implemented on a computer as a computer implemented method, as dedicated hardware, or as a combination of both. As also illustrated in FIG. 9, instructions for the computer, e.g., executable code, may be stored on a computer readable medium 900, e.g., in the form of a series 910 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 9 shows an optical disc 900. Alternatively, the computer readable medium 900 may comprise transitory or non-transitory data 910 representing parameters of a machine learnable model for controlling and/or monitoring a computer-controlled system as described herein.

FIGS. 10a-10f and FIGS. 11a-11d show examples of sampling from a probability distribution. As also discussed elsewhere, SVGD-type sampling works by evolving a set of particles, representing the samples, using a dynamical system through a combination of attractive and repulsive forces among the particles that are governed by an inter-particle distance, given by a kernel function. Using existing techniques, a particle may exert these forces in a restricted neighbourhood around it. The equivariant SVGD sampling techniques provided herein, on the other hand, may be able to effectively model long-range interactions among particles due to the use of equivariant kernel function. Intuitively, by using an equivariant kernel function, a point x may exert forces on others point x' in equivariant SVGD if x' is in the neighbourhood of a point in the orbit $\mathcal{O}(x)$ of x. This is because for a point x', the repulsion and attraction terms may be the same for points in the orbit $\mathcal{O}(x)$. This ability to effectively capture long-range interactions in particular help to make the provided techniques more efficient in sample complexity and/or running time and/or lead to better sample quality. Robustness to different initial configurations of the particles compared to existing techniques may also be improved. These advantages are elaborated on based on the examples in the figures.

Figure 10A:
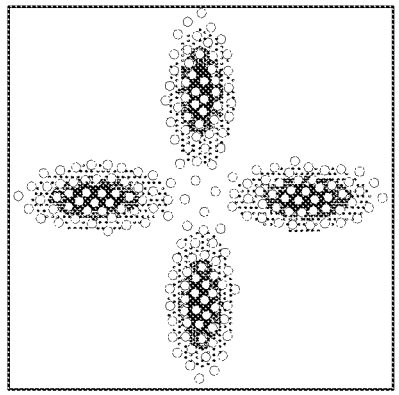
FIGS. 10A-10F and 11A-11D show examples of sampling from a probability distribution, in accordance with the present invention.
Figure 10D:
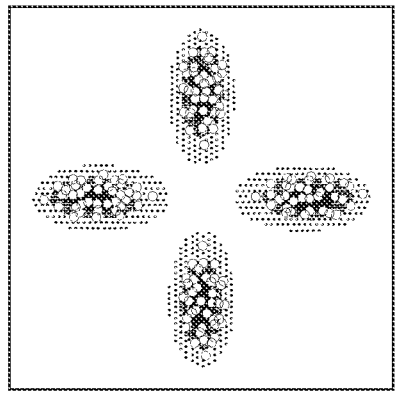
Figure 10B:
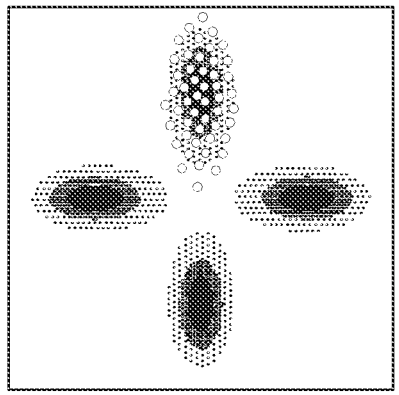
Figure 10E:
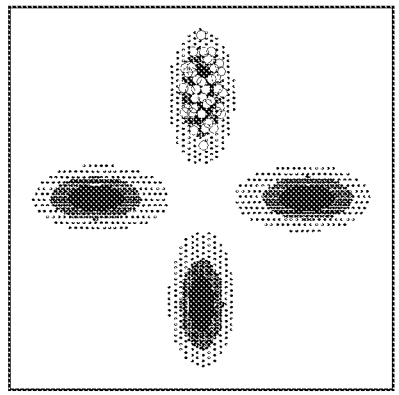
Figure 10C:
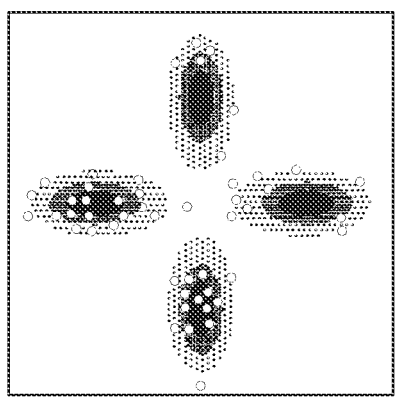
Figure 10F:
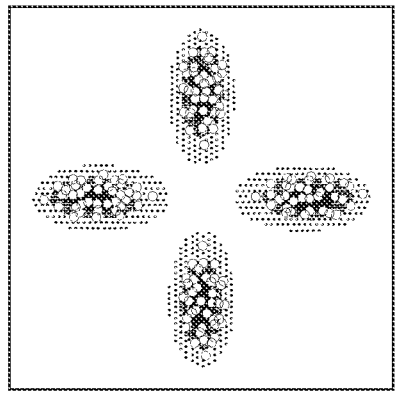

The example of FIGS. 10a-10f shows four Gaussians invariant to the symmetry group $C_4$. In this case, the group factorized distribution $\pi_{|C_4}$ is Gaussian with the original $C_4$-invariant density obtained by rotating $\pi_{|C_4}$ through the set $\{0°, 90°, 180°, 270°\}$. FIG. 10a shows samples generated using the provided equivariant SVGD techniques. FIG. 10b shows the projection of these samples on the group factorized space $X_{|C_4}$. FIG. 10c shows samples obtained by rotating the original samples through the $C_4$-symmetry group. FIGS. 10d-10f show corresponding samples obtained using prior art SVGD sampling.

Figure 11A:
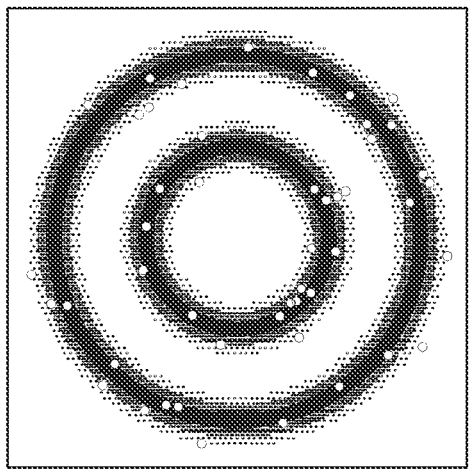
Figure 11B:
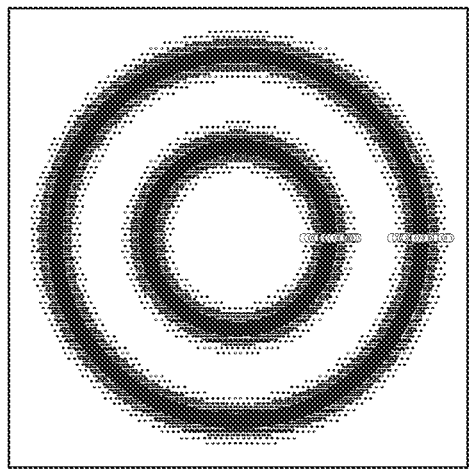
Figure 11C:
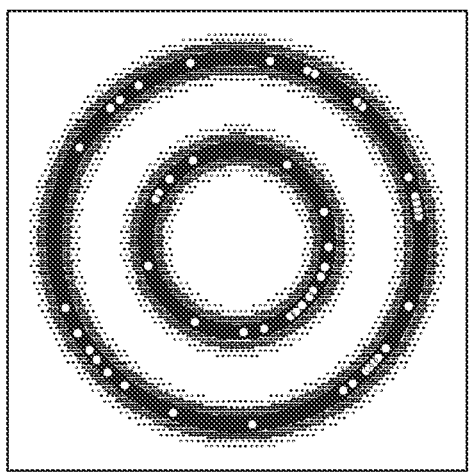
Figure 11D:
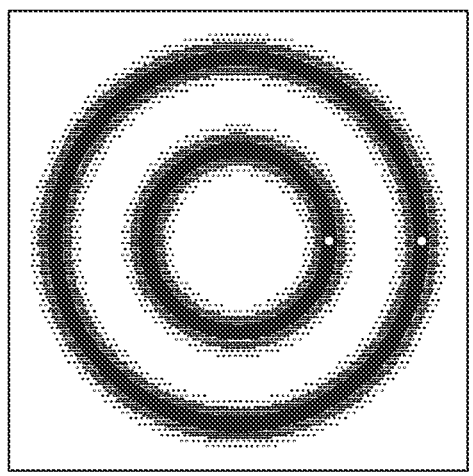

The example of FIGS. 11a-11d shows two concentric circles invariant to the SO(2) symmetry group. In this case, the group factorized space is a union of two disconnected lines with length equal to the thickness of the circles. FIG. 11a shows samples generated using the provided equivariant SVGD techniques, and FIG. 11b shows the projection of these samples on the group factorized space $X_{|SO(2)}$. FIGS. 11c-11d show corresponding examples using prior art SVGD sampling.

The figures are made using the same experimental setup, e.g., same number of samples and number iterations. From projecting the samples onto the factorized space (FIG. 10b s FIG. 10e, FIG. 11b vs FIG. 11d) it can be observed that equivariant SVGD more faithfully captures the target density compared to existing techniques. Furthermore, it can be observed that, due to its ability to model long-range interactions, in the projected space of the invariant sampler, the samples are not close together whereas using the prior art techniques, many samples end up in a configuration where they reside in the same orbit. This phenomenon is most evident in FIG. 11d where samples from prior art SVGD reside on the high-density region throughout the two circles, resulting in all the samples being positioned on top of each other in the factorized space, demonstrating its inability to capture the distribution. On the other hand, FIG. 11b shows that the proposed techniques discourage samples from residing on the same orbit of another samples due to long-range repulsive force from the equivariant kernel allowing to sample more faithfully from the invariant densities.

The inventors also studied the effect of increasing the number of particles, e.g., samples, for the two concentric circles example of FIG. 11. The provided techniques are able to converge in this example to the final configuration within the first 100 iterations with average log-likelihood closely matching the ground truth. Prior art techniques, on the other hand, do not converge to the ground truth with even 32 times more samples and 5000 iterations due to their inability to interact with particles at longer distances.

The inventors also studied the effect of different configurations of the initial particles on the performance of the sampling, in the example of FIG. 10. It is known that prior art techniques have a tendency to collapse to a few local modes that are closest to the initial distribution of the particles. The inventors tested the robustness of the proposed invariant SVGD techniques to particles with initial distributions localized to different regions in the space. By looking at average log-likelihoods of the converged samples for several random initializations comparing this to the ground truth average log-likelihood, it was observed that the proposed techniques are more robust to the initial distribution of particles.

The inventors also evaluated the performance of energy models trained using the provided techniques.

In one evaluation, the model was applied to the double-well potential. The double-well potential describes a simple many-body particle system with, in this experiment, four particles. As is common for many-body particle systems, the double-well potential is invariant to rotation of the particles around the systems centre of mass, translation of the system and permutation of the particles. While the double-well potential has only five distinct meta-stable states, the fact that the potential is invariant means that there are infinite possible configurations of the particles that represent these five meta-stable states. In this scenario meta-stable states are characterized as either local or global minima in the potential function.

Interestingly, the inventors were able to show that, given only a single example configuration of each meta-stable state, an equivariant energy-based model trained as described herein can discover other possible configuration of the meta-stable states as well. An existing EBM model and an equivariant EBM were trained to reconstruct the double-well potential. During training the EBMs were only presented a single configuration of each meta-stable state, augmented by Gaussian noise.

It was found that the samples sampled using prior art techniques correspond to the meta-stable states included in the dataset. On the other hand, samples sampled using the provided techniques also include symmetry transformations of these original meta-stable states. In contrast to existing techniques, an equivariant EBM trained as described may not only reconstruct the potential directly around the samples in the dataset, but also around symmetry transformation of these samples. This highlights the extended generalization capabilities of equivariant EBMs.

The inventors also applied the proposed techniques to conditional molecular generation. Molecular structure generation may be invariant to rotation of the molecule around its geometric centre, translation by an arbitrary vector, and/or permutation of atoms of the same type and can therefore benefit from the provided sampling techniques.

To evaluate the approach, the QM9 molecular dataset was used, containing over 145000 molecules with up to nine Carbon/Oxygen/Nitrogen/Fluorin atoms. For each molecule the dataset contains equilibrium configurations of the atom positions in 3D and various properties such as dipole moment, harmonic frequency and thermodynamical energetics. While the QM9 dataset is most often used for molecular property prediction, it is used here for the problem of molecular structure generation.

For this purpose, the constitutional isomer $C5H8O1$ was considered. To encode the same symmetries in the EBM, an Equivariant Graph Convolutional Neural Network was used.

For the evaluation, molecules were samples using equivariant SVGD with a trained equivariant EBM as the target distribution. While sampling, the relative distance was used as a proxy for the covalent bonds. Despite not having access to the covalent bonds during training, the techniques provided herein were able to generate anecdotally correct molecular structures. Carbon atoms at the outer edges of the molecule are often accompanied by two close hydrogen atoms while carbon molecules near the geometric centre of the molecule are not. Similarly, oxygen atoms, which can only form two bonds, are also not accompanied by hydrogen atoms but rather connect to the carbon atoms. When comparing with the $C5H8O1$ molecules in the dataset, we find that both, dataset and generated molecules, often contain triangles of three atoms or squares of four atoms.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In the device described as including several means, several of these means may be embodied by one and the same item of hardware. The mere fact that certain measures are described separately does not indicate that a combination of these measures cannot be used to advantage.

What is claimed is:

1. A computer-implemented method of training a machine learnable model for controlling or monitoring a computer-controlled system, the machine learnable model being configured to make inferences based on a probability distribution of sensor data, the sensor data representing measurements of: (i) one or more physical quantities of the computer-controlled system, or (ii) an environment of the computer-controlled system, and the machine learnable model being configured to account for one or more symmetries in the probability distribution of the sensor data imposed by: (i) the computer-controlled system, or (ii) the environment of the computer-controlled system, the method comprising:

sampling multiple samples of the sensor data according to the probability distribution by:
sampling initial values for the multiple samples from a source probability distribution, wherein the source probability distribution is invariant to the one or more symmetries,
iteratively evolving the multiple samples, including evolving each selected sample based on similarities of the selected sample to the multiple samples, wherein the similarities are computed according to a kernel function, wherein the kernel function is equivariant to the one or more symmetries, and wherein the selected sample is evolved by computing an attraction term and a repulsion term, and wherein:
the attraction term is computed as a weighted sum of gradient directions of the probability distribution for the multiple samples, wherein the gradient directions are weighed according to the similarities, and the probability distribution is configured to be invariant to the one or more symmetries;
the repulsion term is computed as a sum of respective gradient directions of the kernel function for the multiple samples given the selected sample; and updating model parameters of the machine learnable model based on the evolved multiple samples.

2. The method of claim 1, wherein the probability distribution includes an exponential of a trainable energy function, and the updating of the model parameters includes approximating an expected value of a derivative of an energy function by evaluating a derivative on the evolved multiple samples.

3. The method of claim 2, wherein each sample represents image data, and wherein the one or more symmetries include at least one of the following: (i) a rotation symmetry, (ii) a translation symmetry, (iii) a reflection symmetry.

4. The method of claim 1, further comprising:
evaluating the kernel function on a first and second sample by transforming the first and second samples according to respective symmetries;
evaluating an underlying kernel function on the transformed first and second samples; and
aggregating respective outputs of the underlying kernel function.

5. The method of claim 4, further comprising:
transforming the first and second samples according to a strict subset of the one or more symmetries imposed by: (i) the computer-controlled system, or (ii) the environment of the computer-controlled system.

6. The method of claim 1, further comprising:
evaluating the kernel function on a first and second sample by mapping the first and second samples to factorized first and second samples according to a mapping that is invariant to the one or more symmetries, and evaluating an underlying kernel on the factorized first and second samples.

7. The method of claim 1, wherein the kernel function is matrix-valued.

8. A computer-implemented method of applying a machine learnable model for controlling or monitoring a computer-controlled system, the machine learnable model being configured to make inferences based on a probability distribution of sensor data, the sensor data representing measurements of one or more physical quantities of: (i) the computer-controlled system, or (ii) an environment of the computer-controlled system, and the machine learnable model being configured to account for one or more symmetries in the probability distribution of the sensor data imposed by: (i) the computer-controlled system, or (ii) the environment of the computer-controlled system, the probability distribution being configured to be invariant to the one or more symmetries, the method comprising the following step:
accessing model data representing the machine learnable model, wherein the machine learnable model has been trained by:
sampling multiple samples of first sensor data according to the probability distribution by:
sampling initial values for the multiple samples from a source probability distribution, wherein the source probability distribution is invariant to the one or more symmetries,
iteratively evolving the multiple samples, including evolving each selected sample based on similarities of the selected sample to the multiple samples, wherein the similarities are computed according to a kernel function, wherein the kernel function is equivariant to the one or more symmetries, and wherein the selected sample is evolved by computing an attraction term and a repulsion term, and wherein:
the attraction term is computed as a weighted sum of gradient directions of the probability distribution for the multiple samples, wherein the gradient directions are weighed according to the similarities, and the probability distribution is configured to be invariant to the one or more symmetries,
the repulsion term is computed as a sum of respective gradient directions of the kernel function for the multiple samples given the selected sample, and
updating model parameters of the machine learnable model based on the evolved multiple samples;
applying the machine learnable model to obtain a model output by at least one of the following:
(i) via a sensor interface, obtaining sensor data of: (a) the computer-controlled system, or (b) the environment of the computer-controlled system, and applying the trained machine learnable model to the sensor data, including determining a probability for the sensor data according to the probability distribution,
(ii) using the machine learnable model as a generative model to generate multiple synthetic samples of the sensor data according to the probability distribution;
outputting the model output for use in the controlling or the monitoring.

9. The method of claim 8, wherein the outputting includes flagging the sensor data as out-of-distribution when the probability for the sensor data is below a threshold.

10. The method of claim 8, wherein the probability distribution represents a joint distribution of sensor data and corresponding labels, and wherein the outputting includes assigning a label to the sensor data based on respective joint probabilities of the sensor data with respective labels.

11. The method of claim 8, further comprising:
training a further machine learning model for the controlling or the monitoring, wherein the training uses the generated multiple synthetic samples as training data or test data.

12. The method of claim 11, wherein the probability distribution represents a joint distribution of sensor data and corresponding labels, and wherein the method further includes obtaining one or more target labels and generating the multiple synthetic samples according to the one or more target labels.

13. A system for training a machine learnable model for controlling or monitoring a computer-controlled system, the machine learnable model being configured to make inferences based on a probability distribution of sensor data, the sensor data representing measurements of one or more physical quantities of: (i) the computer-controlled system, or its (ii) an environment of the computer-controlled system, and the machine learnable model being configured to account for one or more symmetries in the probability distribution of the sensor data imposed by: (i) the computer-controlled system, or (ii) the environment of the computer-controlled system, the system comprising:
a data interface configured to accessing model parameters of the machine learnable model;
a processor subsystem configured to sample multiple samples of the sensor data according to the probability distribution and to update the model parameters of the machine learnable model based on the multiple samples, the sampling including:

sampling initial values for the multiple samples from a source probability distribution, wherein the source probability distribution is invariant to the one or more symmetries;

iteratively evolving the multiple samples, including evolving each selected sample based on similarities of the selected sample to the multiple samples, wherein the similarities are computed according to a kernel function, wherein the kernel function is equivariant to the one or more symmetries, and wherein the selected sample is evolved by computing an attraction term and a repulsion term, wherein:

the attraction term is computed as a weighted sum of gradient directions of the probability distribution for the multiple samples, the gradient directions being weighed according to the similarities, and the probability distribution is configured to be invariant to the one or more symmetries, and the repulsion term is computed as a sum of respective gradient directions of the kernel function for the multiple samples given the selected sample.

14. A system for applying a machine learnable model for controlling or monitoring a computer-controlled system, wherein the machine learnable model is configured to make inferences based on a probability distribution of sensor data, the sensor data representing measurements of one or more physical quantities of: (i) the computer-controlled system, or (ii) an environment of the computer-controlled system, the machine learnable model being configured to account for one or more symmetries in the probability distribution of the sensor data imposed by: (i) the computer-controlled system, or (ii) the environment of the computer-controlled system, and the probability distribution being configured to be invariant to the one or more symmetries, the system comprising:

a data interface configured to accessing model data representing the machine learnable model, the machine learnable model being trained by:

sampling multiple samples of first sensor data according to the probability distribution by:

sampling initial values for the multiple samples from a source probability distribution, wherein the source probability distribution is invariant to the one or more symmetries, iteratively evolving the multiple samples, including evolving each selected sample based on similarities of the selected sample to the multiple samples, wherein the similarities are computed according to a kernel function, wherein the kernel function is equivariant to the one or more symmetries, and wherein the selected sample is evolved by computing an attraction term and a repulsion term, and wherein:

the attraction term is computed as a weighted sum of gradient directions of the probability distribution for the multiple samples, wherein the gradient directions are weighed according to the similarities, and the probability distribution is configured to be invariant to the one or more symmetries, the repulsion term is computed as a sum of respective gradient directions of the kernel function for the multiple samples given the selected sample, and updating model parameters of the machine learnable model based on the multiple samples;

a processor subsystem configured to apply the machine learnable model to obtain a model output, and to output the model output for use in the controlling or the monitoring, wherein the applying includes at least one of the following:

(i) via a sensor interface of the system, obtaining the sensor data of: (a) the computer-controlled system, or (b) the environment of the computer-controlled system, and applying the trained machine learnable model to the sensor data, including determining a probability for the sensor data according to the probability distribution;

(ii) using the machine learnable model as a generative model to generate multiple synthetic samples of the sensor data according to the probability distribution.

15. A non-transitory computer-readable medium on which are stored instructions for training a machine learnable model for controlling or monitoring a computer-controlled system, the machine learnable model being configured to make inferences based on a probability distribution of sensor data, the sensor data representing measurements of one or more physical quantities of: (i) the computer-controlled system, or an environment of the computer-controlled system, and the machine learnable model being configured to account for one or more symmetries in the probability distribution of the sensor data imposed by: (i) the computer-controlled system, or the environment of the computer-controlled system, the instructions, when executed by a processor system, causing the processor system to perform the following steps:

sampling multiple samples of the sensor data according to the probability distribution by:

sampling initial values for the multiple samples from a source probability distribution, wherein the source probability distribution is invariant to the one or more symmetries, iteratively evolving the multiple samples, including evolving each selected sample based on similarities of the selected sample to the multiple samples, wherein the similarities are computed according to a kernel function, wherein the kernel function is equivariant to the one or more symmetries, and wherein the selected sample is evolved by computing an attraction term and a repulsion term, and wherein:

the attraction term is computed as a weighted sum of gradient directions of the probability distribution for the multiple samples, wherein the gradient directions are weighed according to the similarities, and the probability distribution is configured to be invariant to the one or more symmetries;

the repulsion term is computed as a sum of respective gradient directions of the kernel function for the multiple samples given the selected sample; and updating model parameters of the machine learnable model based on the evolved multiple samples.

* * * * *